(12) United States Patent
Merz et al.

(10) Patent No.: US 12,291,364 B2
(45) Date of Patent: May 6, 2025

(54) ISOLATOR SYSTEM FOR FILLING A CONTAINER WITH A LIQUID, TRANSFER STATION FOR TRANSFERRING A CONTAINER AND METHOD THEREFOR

(71) Applicant: Groninger & Co. GmbH, Crailsheim (DE)

(72) Inventors: Armin Merz, Ellwangen (DE); Roland Engelhard, Aurach-Weinberg (DE); Josef Veile, Westhausen (DE); Jens Weinmann, Crailsheim (DE)

(73) Assignee: GRONINGER & CO. GMBH, Crailsheim (DE)

( * ) Notice: Subject to any disclaimer, the term of this patent is extended or adjusted under 35 U.S.C. 154(b) by 189 days.

(21) Appl. No.: 17/881,407

(22) Filed: Aug. 4, 2022

(65) Prior Publication Data

US 2023/0002088 A1 Jan. 5, 2023

Related U.S. Application Data

(63) Continuation of application No. PCT/EP2021/052442, filed on Feb. 2, 2021.

(30) Foreign Application Priority Data

Feb. 4, 2020 (DE) ............ 10 2020 102 768.0

(51) Int. Cl.
*B65B 3/00* (2006.01)
*B65B 7/16* (2006.01)
(Continued)

(52) U.S. Cl.
CPC ............ *B65B 3/006* (2013.01); *B65B 7/161* (2013.01); *B65B 7/2821* (2013.01); *B65B 55/18* (2013.01); *B65B 63/08* (2013.01)

(58) Field of Classification Search
CPC ....... B65B 63/08; B65B 3/006; B65B 7/2821; B65B 7/161; B65B 55/18
See application file for complete search history.

(56) References Cited

U.S. PATENT DOCUMENTS 8,978,344 B2 3/2015 Krauss et al.
10,669,049 B2 6/2020 Eberhardt et al.
(Continued)

FOREIGN PATENT DOCUMENTS

DE 6606315 U 9/1970
DE 2020886 A1 11/1971
(Continued)

OTHER PUBLICATIONS

International Search Report and Written Opinion issued for PCT/EP2021/052442 on May 3, 2021.
(Continued)

*Primary Examiner* — Andrew M Tecco
*Assistant Examiner* — Nicholas E Igbokwe
(74) *Attorney, Agent, or Firm* — Reising Ethington PC

(57) ABSTRACT

An isolator system for filling a container with a liquid, the isolator system comprises a filling module having a filling station for filling the container with the liquid, a stopper placing station for placing a stopper on the filled container, and a plurality of handling devices for handling the container within the filling module; a first transfer station for transferring the container to be filled into the filling module; a second transfer station for transferring the filled container out of the filling module; and a control device. The present application also discloses a transfer station for transferring a container and several methods.

67 Claims, 19 Drawing Sheets

(51) Int. Cl.
*B65B 7/28* (2006.01)
*B65B 55/18* (2006.01)
*B65B 63/08* (2006.01)

(56) References Cited

U.S. PATENT DOCUMENTS

| | | | | |
|---|---|---|---|---|
| 2018/0162572 | A1* | 6/2018 | Trilli | B65B 55/027 |
| 2018/0282008 | A1* | 10/2018 | Diaz Guerrero | B65B 55/027 |
| 2019/0135462 | A1* | 5/2019 | Broadbent | B65D 41/28 |
| 2019/0315004 | A1* | 10/2019 | Bechini | B25J 21/005 |
| 2019/0337658 | A1* | 11/2019 | Diaz Guerrero | B65B 3/003 |

FOREIGN PATENT DOCUMENTS

| | | |
|---|---|---|
| DE | 10330700 A1 | 1/2005 |
| DE | 102008001287 A1 | 10/2009 |
| DE | 102009027452 A1 | 1/2011 |
| DE | 102014214697 A1 | 1/2016 |
| EP | 3335844 A1 | 6/2018 |
| WO | WO2016198391 A1 | 12/2016 |

OTHER PUBLICATIONS

Office Action issued by the German Patent Office for application DE 21 703 242.4 on Mar. 6, 2024.
Informal Translation of the Office Action issued by the German Patent Office for application DE 21 703 242.4 on Mar. 6, 2024.
Examination Report issued by the German Patent Office for application DE 10 2020 102 768.0 on Sep. 3, 2020; 5 pages.
English translation of the examination report issued by the German Patent Office for application DE 10 2020 102 768.0 on Sep. 3, 2020; 5 pages.
Extended European search report issued for EP 24155999.6 on Jun. 3, 2024.
Informal Translation of the Extended European search report issued for EP 24155999.6 on Jun. 3, 2024.
YouTube video clip entitled "APC Glass Ampule Pick and Place Robotic Cell," uploaded Jun. 11, 2018 by user "juliotogo22". Retrieved from Internet: <https://youtu.be/vmkxvWIno9Y> 1:05-1:20.
Pharma Manager video clip entitled "Automatic filling and closing line for glass ampules with medicines," uploaded Sep. 7, 2020. Retrieved from Internet: <https://pharma-manager.com/germany/video/automatic-glass-ampoule-filling-and-capping-line-with-medicine/> 0:00-0:20.
Equipnet posting to sell Bosch & Strunck Mod. AVR D08 (1982)—Ampule filling machine. Retrieved from Internet: <https://www.equipnet.com/bosch-strunck-mod-avr-d08-ampoule-fillin-listid-829836>.
YouTube video clip entitled "Our new robotic filling line in action," uploaded Dec. 13, 2016 by user "AqVida GmbH". Retrieved from Internet: <https://youtu.be/TIH85ZcFmWA> 2:00-2:07.
YouTube video clip entitled "Closed ampules filling machine AFM 100 HD," uploaded Oct. 13, 2016 by user "Ponctek". Retrieved from Internet: <https://www.youtube.com/watch?v=D-5dhRXtPBE>.
YouTube video clip entitled "High speed ampule filing and sealing compete line," uploaded Oct. 18, 2016 by user "Kambert Machinery". Retrieved from Internet: <https://youtu.be/HZcLB_500Bs>.
Third Party Observation for application No. EP20210703242 received on Oct. 19, 2023.
English Translation of the Third Party Observation for application No. EP20210703242 filed on Oct. 19, 2023.
English Translation of the International Preliminary Report on Patentability issued for PCT/EP2021/052442 on Jul. 28, 2022.
Office Action issued by the Canadian Patent Office for application CA 3,166,131 on Oct. 17, 2024.

* cited by examiner

ISOLATOR SYSTEM FOR FILLING A CONTAINER WITH A LIQUID, TRANSFER STATION FOR TRANSFERRING A CONTAINER AND METHOD THEREFOR

CROSS-REFERENCE TO RELATED APPLICATIONS

This is a Continuation application of International patent application PCT/EP2021/052442, filed Feb. 2, 2021, which claims the priority of German patent application DE 10 2020 102 768.0, filed Feb. 4, 2020. Both application PCT/EP2021/052442 and DE 10 2020 102 768.0 are herewith incorporated by reference in their entirety.

BACKGROUND

The present application relates to modular isolator systems and methods for filling a container with a liquid. Further, the present application relates to a transfer station and method for transferring a container between a first module and a second module.

The present application is primarily concerned with aseptic isolators which have a filling area for fluid filling of objects (e.g. vials, cartridges, bottles, syringes and/or the like), for example by means of filling needles. The term "isolator" is generally understood to mean an enclosed space which is hermetically and gas-tightly sealed from the surrounding working space. Within an isolator, a defined atmosphere can be generated for processing sensitive or hazardous products. For this purpose, for example, a ventilation system can be provided by means of which the defined atmosphere is generated.

In this context, isolators are commonly used in biopharmaceutical process technology, for example as part of a filling line with multiple process and processing stations, to create a highly clean or sterile, i.e. germ-free, environment and to avoid contamination by germs, in particular bacteria, viruses, pathogens and/or the like.

The transfer of the objects between the individual processing stations as well as the handling of the handling of the objects at the individual processing stations can, for example, be carried out manually by means of glove port by an operator. The glove port can also be used to handle the germ monitoring during production or possibly to carry out troubleshooting. However, this "manual" handling by means of glove port is enormously time-consuming. Furthermore, glove pass-throughs, which in practice are made of rubber or plastic, especially butyl, can be damaged when gripping the objects to be handled. Glove ports thus also pose an increased risk of contamination and/or safety as a result of leakage. The non-use and, in the best case, the omission of these glove ports thus eliminates the risk of contamination that they pose.

For example, to reduce this risk of contamination within an isolator, handling equipment, such as robots, are used within the isolator to transfer the objects to be filled within the isolator between the individual processing stations and to handle the objects at the individual processing stations.

For example, WO 2016/198391 A1 discloses a method for filling and closing bottles, cartridges, syringes and the like, the bottles, cartridges, syringes and the like being generally referred to as containers, such containers being individually housed in respective seats of a first nest which in turn is contained in a first transport tray. The method comprises feeding the containers individually housed in respective seats of the first nest, which in turn is associated with the first transport tray; removing at least one individual container at a time from the first nest; and transferring the at least one container to a filling station to fill it with a substance; transferring the at least one filled container to a stopper placing station to place a stopper on the container; transferring the at least one filled container to a crimping station, the container being passed through a partition; sealing the at least one container at the crimping station; inserting the at least one sealed container into a respective seat of a second nest. The filling station and the stopper placing station are arranged in a filling module. The crimping station is arranged in a crimping module. The partition is arranged between the filling module and the crimping module. The filling module and the crimping module each have a handling device by means of which the containers are handled in the respective module.

However, the known isolator systems and processes still leave room for improvement in terms of throughput rate, design and handling.

BRIEF SUMMARY

Therefore, it is an object of the present application to provide an improved isolator system and an improved method for filling a container with a liquid. In particular, it is an object of the present application to increase the throughput rate and to simplify the construction and handling.

In a first aspect, an isolator system for filling a container with a liquid, the system comprising:
- a filling module having a filling station for filling the container with the liquid, a stopper placing station for placing a stopper on the filled container, and a plurality of handling devices for handling the container within the filling module;
- a first transfer station for transferring the container to be filled into the filling module;
- a second transfer station for transferring the filled container from the filling module; and
- a control device,
- wherein the control device is configured to control the filling station, the stopper placing station, and the plurality of handling devices such that the following steps are performed:
  - first transferring of the container to be filled from the first transfer station to the filling station by means of one or more handling devices of the plurality of handling devices;
  - filling the container with the liquid in the filling station;
  - second transferring of the container from the filling station to a stopper placing station by means of one or more handling devices of the plurality of handling devices;
  - placing a stopper on the filled container in the stopper placing station;
  - third transferring of the container from the stopper placing station to the second transfer station using one or more handling devices of the plurality of handling devices.

In a second aspect, a method of filling a container with a liquid in a filling module of an isolator system is provided, the method comprising the steps of:
- arranging the container to be filled in a first transfer station for transferring the container into the filling module;
- first transferring of the container from the first transfer station to a filling station of the filling module by means of one or more handling devices of a plurality of handling devices of the filling module;

filling the container with the liquid in the filling station;

second transferring of the container from the filling station to a stopper placing station of the filling module by means of one or more handling devices of the plurality of handling devices;

placing a stopper on the container in the stopper placing station;

third transferring the container from the stopper placing station to a second transfer station for transferring the container from the filling module by means of one or more handling devices of the plurality of handling devices.

The isolator system can be a system that is arranged within an isolator. In particular, the individual modules of the system may be arranged within the isolator. Furthermore, the isolator system can also be an isolator in which the individual modules of the system are arranged.

The container is preferably a pharmaceutical container, for example a syringe, vial, bottle, cylindrical ampoule or the like. The container is preferably cylindrical in shape. This means that the container is circular cylindrical in cross-section. The liquid is preferably a pharmaceutical, cosmetic or toxic liquid.

The filling station has means for filling the container. For example, the filling station can have one or more filling needles for dispensing the liquid into a container. The filling station can also have a metering device by means of which the quantity of liquid to be dispensed can be metered. The filling station can be connected to a fluid reservoir, in particular a tank, via one or more hoses. The metering device may be arranged in a fluid path between the liquid reservoir and the filling needle. The fluid reservoir may be arranged inside or outside the filling module. Furthermore, the filling station can be designed in such a way that several, in particular two, containers can be filled simultaneously. For this purpose, the filling station can, for example, have several, in particular two, filling needles.

The stopper placing station has means for setting a stopper. For this purpose, the stopper placing station can have, for example, a support structure and stopper insertion device that can be moved by means of the support structure. The stopper placing device is designed to insert a stopper into the opening of the container. The stopper placing station may further comprise a feeder through which the stoppers are fed to the stopper insertion device. The stopper placing station may be connected to a stopper reservoir in which a plurality of stoppers are stored. The stopper reservoir may comprise a singling device in which the stoppers are singled before they are fed singled via the feed to the stopper placing device. Alternatively, the feed can be carried out via loose provision of the stoppers on a plate. The position of the stoppers can be detected via a sensor device, for example a camera. The stopper placing device can have a robot that picks up a stopper on the basis of the detected position and feeds it to the stopper placing device or places it directly on the container. Furthermore, the stopper placing station can be designed in such a way that a stopper can be placed on several, in particular two, containers at the same time.

Each handling device has means for handling the container. For example, each handling device can have a robot with an end effector. The robot can, for example, have a carrier structure, preferably with multiple axes, to the end of which the end effector is attached. By means of the carrier structure, the end effector can be moved within the filling module. The end effector can be designed to handle the container. For this purpose, the end effector may comprise a gripping tool by means of which the end effector can grip the container.

Transferring the container means that the container is moved from a first location, for example the filling station, to a second location, for example the stopper placing station. To transfer the container, a handling device can, for example, pick up or grip the container at the first location, move it to the second location and release it again at the second location.

Furthermore, each handling device can be designed in such a way that it can handle several, in particular two, containers simultaneously. For this purpose, each handling device can, for example, have an end effector with several, in particular two, gripping tools.

The control device is set up to control one or more, in particular all, modules of the isolator system. For this purpose, the control device can send control commands to the handling devices and stations of the respective module of the isolator system in order to execute the respective control steps of the process. For example, the control device may send control commands to the filling station to fill the container. Further, the control device may send control commands to one or more handling devices to transfer the container. Further, the control device may send control commands to the stopper placing station to place a stopper on the container.

For this purpose, the control device may comprise a programmable logic controller (PLC), an integrated circuit (IC) (for example, a microcontroller, a field programmable gate array (FPGA) or an application-specific integrated circuit (ASIC)) or a computer with a processor, by means of which the control commands are generated according to a predetermined program. The program may be stored on a permanent storage medium, for example.

Up to now, it has been common practice in the state of the art for only one handling device to be used in a filling module, by means of which a container is transferred to a filling station, transferred from the filling station to a stopper placing station after filling, and transferred further from the stopper placing station after placing.

Due to the fact that the filling module has several handling devices for handling the container, it is possible that the individual transfer steps are performed by different handling devices. In particular, if several containers are filled one after the other in the filling module, several containers can be transferred simultaneously to different processing stations in the filling module. In particular, the steps of first transferring, second transferring, and third transferring can be performed in parallel for different containers. For example, a container to be filled can be transferred from the transfer station to the filling station by means of a first handling device, while an already filled container is transferred from the filling station to the stopper placing station or from the stopper placing station to the second transfer station by means of a second handling device. In this way, compared to handling by means of a single handling device, the throughput rate or processing speed can be increased. In other words, this increases the throughput rate in the filling process.

In a third aspect, an isolator system for filling a container with a liquid is provided, the isolator system comprising:

a filling module having a filling station for filling the container with the liquid and having a first handling device for handling the container within the filling module;

a first transfer station for transferring the container to be filled into the filling module; and a control device, wherein the filling station comprises a filling needle for dispensing the liquid, the control device being arranged to control the filling station and the first handling device such that the following steps are performed:

first transferring of the container to be filled from the first transfer station to the filling station by means of the first handling device;

filling the container with the liquid in the filling station by means of the filling needle; and moving the container relative to the filling needle by means of the first handling device while the container is being filled.

In a fourth aspect, a method of filling a container with a liquid in a filling module of an isolator system is provided, the method comprising the steps of:

arranging the container to be filled in a first transfer station for transferring the container into the filling module;

first transferring of the container from the first transfer station to a filling station of the filling module by means of a first handling device of the filling module;

filling the container with the liquid in the filling station by means of a filling needle of the filling station; and moving the container relative to the filling needle by means of the first handling device while the container is being filled.

In the prior art, it has been common practice for the container to be filled to be first deposited in the filling station and then filled. During filling, the filling needle carrier carrying the filling needles is moved relative to the container so that the filling needles are moved relative to the container to avoid bubbles forming in the container during filling. For this purpose, the filling needle is moved during filling in such a way that the tip of the filling needle is located close to the surface of the liquid.

According to the third and fourth aspects, it is now proposed to perform this relative movement by means of the first handling device instead. This means that no additional mechanics are required to perform the relative movement, which simplifies the design of the isolator system. In addition, the container also no longer has to be set down in the filling station for filling. Instead, the container can simply be held under the filling needle by means of the first handling device. In this way, handling during the filling process is improved and the throughput rate increased.

In a fifth aspect, there is provided a transfer station for transferring a container between a first module and a second module, the transfer station comprising at least one receptacle for receiving the container, the receptacle being open to both modules in a transfer direction between the two modules, such that the container is insertable into the receptacle in the transfer direction by means of handling device of the first module and removable from the receptacle in the transfer direction by means of handling device of the second module, and wherein the transfer station comprises a retaining device for holding the container in the receptacle In a sixth aspect, there is provided a method for transferring a container between a first module and a second module by means of a transfer station having a receptacle for receiving the container, the receptacle being open to both modules in a transfer direction between the two modules, the method comprising the steps of:

inserting the container into the receptacle by means of a handling device of the first module in the transfer direction;

holding the container in the receptacle by means of a retaining device; and removing the container from the holder by means of a handling device of the second module in the transfer direction.

The first module and the second module may be modules of an isolator system, for example the isolator system according to the first or third aspect. The modules are adjacent to each other and are connected to each other by means of the transfer station. For example, the modules may be a removal module, a filling module, a crimping module, a freeze-drying module, or an external washing module.

The transfer direction is the direction from the first module to the second module. In other words, the transfer direction is the direction in which the container is moved when it is transferred from the first module to the second module.

The container is inserted into the holder in the transfer direction. This means that the receptacle is opened towards the first module in such a way that the container can be inserted into the receptacle by a movement in the transfer direction.

Accordingly, the container is removed from the holder in the transfer direction. This means that the receptacle is opened towards the second module in such a way that the container can be removed from the receptacle by a movement in the transfer direction.

If the container is arranged in the holder, the container is held by the retaining device. The container is held in such a way that the container can be removed in the transfer direction.

In the prior art, it was always necessary to insert a container into a receptacle of a transfer station and to remove it, which may require a movement perpendicular to the transfer direction or a vertical movement. By means of the transfer station according to the fifth and sixth aspects, the container can be inserted into or removed from the receptacle directly in the transfer direction without requiring a movement perpendicular to the transfer direction.

In this way, the container can be easily transferred between two modules, thereby simplifying handling and increasing the throughput rate.

In a first refinement, the plurality of handling devices includes a first handling device and a second handling device.

By means of two handling devices, the control steps in the filling module can be carried out more quickly, since the process steps can be divided between the two handling devices. In this way, individual process steps can be carried out simultaneously when handling several containers, thus increasing the throughput rate, in particular doubling it.

In a further refinement, the step of first transferring by means of the first handling device, the step of second transferring by means of the first handling device and/or the second handling device, and the step of third transferring by means of the second handling device are performed.

In this way, by means of two handling devices, a first container to be filled can be transferred for filling, while a second filled container can be transferred simultaneously for placing and/or to the second transfer station. In this way, individual process steps can be carried out simultaneously when handling several containers, thus increasing the throughput rate, in particular doubling it.

In a further refinement, the filling module comprises an intermediate station between the filling station and the stopper placing station, wherein in the step of second transferring, the first handling device transfers the container from the filling station to the intermediate station, and the second handling device transfers the container from the intermediate station to the stopper placing station.

Thus, the step of the second transfer is carried out partly by means of the first handling device and partly by means of the second handling device.

In a further refinement, the isolator system further comprises a removal module for removing the container to be filled from a nest.

A plurality of containers to be filled is provided in a nest. The nest can be introduced into the isolator in a transport trough (tub) via a transfer lock. The transfer lock represents a plant inlet. The transfer lock can be designed as an H2O2 lock. In addition to an H2O2 airlock, there are other ways in which the transfer tray can enter the removal module. For example, decontamination chambers using electron beam, plasma beam, gamma beam or nitrogen dioxide processes may be used. It is also possible to work without sterilization procedures by pushing or transferring the transport tubs directly into the removal module after cutting open the outer bag. The transport tray can be inserted manually or mechanically into the transfer gate on the input side after an outer bag in particular has been cut open around it. Furthermore, the transport tray can be opened, the opened outer bag and/or an inner bag can be removed and/or the nest can be lifted out of the transport tray. With the airlock closed, the transport tray is then decontaminated with nest, if necessary, via hydrogen peroxide (H2O2) or one of the other methods above. Access to the removal module is then opened and processing begins. The removal module may include a removal station and a handling device. In the removal station, the nest may be held or parked, while the handling device removes each container individually from the nest, transfers it to the first transfer station, and places it therein for transfer to the filling module. The handling device can also be designed in such a way that it can remove several, in particular two, containers simultaneously from the nest and arrange them in the transfer station.

In a further refinement, the removal module is arranged upstream of the filling module.

The removal module is thus arranged before the filling module. The containers are thus first removed from the nest and then transferred to the filling module.

In a further refinement, the first transfer station is arranged between the removal module and the filling module.

In this way, the container can be removed in the removal module and transferred directly to the filling module.

In a further refinement, the isolator system further comprises a crimping module for sealing the filled container.

The crimping module can have a crimping station and one or more handling devices for handling the filled container. In the crimping station, the container is closed by means of a lid, in particular an aluminum cap. For this purpose, the lid is placed on the opening of the container in the crimping station and crimped on the upper edge of the container. This process is therefore also referred to as "crimping". The crimping station may further include a feeder through which lids can be fed. The crimping station may be connected to a lid reservoir in which a plurality of lids are stored. The lid reservoir may have a singling device in which the lids are singled before they are fed singled via the feed to the crimping station. The filled container may be transferred from the second transfer gate to the crimping station by one or more of the handling device. Alternatively, the feeding can be done by loosely providing the lids on a plate. The position of the lids may be detected by a sensor device, such as a camera. The crimping station can have a robot that picks up a lid based on the detected position and feeds it to the crimping station or places it directly on the opening of the container. Furthermore, the crimping station can be designed in such a way that several, in particular two, containers can be closed simultaneously.

In a further refinement, the crimping module is arranged downstream of the filling module, in particular wherein the filling module is arranged between the removal module and the crimping module.

The crimping module is thus arranged after the filling module. The containers are thus first filled in the filling module and then transferred to the crimping module.

In a further refinement, the second transfer station is arranged between the filling module and the crimping module.

In this way, the container can be filled in the filling module and transferred directly to the crimping module for sealing.

In a further refinement, the isolator system further comprises a freeze-drying module for freeze-drying the filled containers.

For this purpose, the freeze-drying module can have a freeze-dryer in which the container can be freeze-dried. Alternatively, the freeze-dryer can also be arranged outside the isolator, whereby the freeze-dryer can be coupled to the isolator, in particular to the freeze-drying module. The freeze-drying module may further comprise one or more handling devices for handling the filled container. By means of the handling devices, the container may be handled, in particular transferred, within the freeze-drying module. In particular, the container can be inserted into the freeze-dryer by means of one of the handling devices and removed from the freeze-dryer after freeze-drying. For filling the freeze-dryer, it can also be provided that one or more trays are loaded with containers to be freeze dried and the freeze-dryer is loaded therewith. After freeze-drying, the trays can be unloaded from the freeze-dryer and the freeze-dried containers removed from the tray. The freeze-dryer can be loaded with an entire batch or batch of containers. The freeze-drying process runs for several hours or days before the freeze-dryer is unloaded again.

In a further refinement, the freeze-drying module is arranged downstream of the filling module, in particular wherein the freeze-drying module is arranged between the filling module and the crimping module.

In this way, the contents of the container can be freeze-dried after filling. For this purpose, the container can be transferred to the freeze-drying module for freeze-drying after filling and stoppering. After freeze-drying, the container can then be transferred to the crimping module for capping.

In a further refinement, the second transfer station is arranged between the filling module and the freeze-drying module.

In this way, the container can be filled in the filling module and transferred directly to the freeze-drying module for freeze-drying.

In a further refinement, the isolator system further comprises a third transfer station between the crimping module and the freeze-drying module for transferring the container between the crimping module and the freeze-drying module.

If the crimping module is located downstream of the freeze-drying module, the container can be transferred directly to the crimping module for capping via the third transfer station after freeze-drying in the freeze-drying module. If the crimping module is located upstream of the freeze-drying module, the container can be transferred directly to the freeze-drying module for freeze-drying via the third transfer station after being sealed in the crimping module.

In a further refinement, the isolator system further comprises a transferring module for transferring the container between the filling module, the crimping module, and the freeze-drying module.

By means of the transferring module, the container can be transferred after filling either from the filling module to the crimping module or from the filling module to the freeze-drying module, depending on whether the container is to be freeze-dried. If the container is freeze-dried in the freeze-drying module, the container is transferred from the freeze-drying module to the crimping module after freeze-drying by means of the transferring module. The transferring module may include one or more handling devices for handling or transferring the container within the transferring module.

In a further refinement, the transferring module is arranged between the filling module, the crimping module and the freeze-drying module.

In this way, the container can optionally be transferred from the filling module directly to the crimping module or as an intermediate station to the freeze-drying module for freeze-drying, after which the container is also transferred further to the crimping module.

In a further refinement, the second transfer station is arranged between the filling module and the transferring module.

In this way, the container can be filled in the filling module and transferred directly to the transferring module for optional transfer to the crimping module or freeze-drying module.

In a further refinement, the isolator system further comprises a fourth transfer station between the transferring module and the crimping module for transferring the container between the transferring module and the crimping module, and wherein the isolator system further comprises a fifth transfer station between the transferring module and the freeze-drying module for transferring the container between the transferring module and the freeze-drying module.

By means of the fourth transfer station, the container can be transferred from the transferring module directly to the crimping module after filling in the filling module or after freeze-drying in the freeze-drying module. By means of the fifth transfer station, the container can be transferred from the transferring module directly to the freeze-drying module after filling in the filling module.

In a further refinement, the isolator system further comprises an external washing module for washing the exterior of the container.

By washing the outside of a container it is to be understood that the outside of the container is freed from impurities, in particular germs, liquid residues and/or powder residues, which have occurred during filling and/or freeze-drying and/or closing of the container. For example, for exterior washing, the container may be rinsed with a sterile liquid, particularly sterile water, and/or blown off with an inert gas or sterile air to remove the contaminants. For example, the external washing station may have an array of nozzles from which sterile water exits for cleaning and sterile air exits for drying. Preferably, cleaning agents, such as caustic soda, are mixed with the sterile water.

In another refinement, the external washing module is arranged downstream of the crimping module.

After the container has been sealed, it is thus washed externally in the external washing module to remove any contamination that may have occurred.

In a further refinement, the isolator system further comprises a sixth transfer station between the crimping module and the external washing module for transferring the container between the crimping module and the external washing module.

In this way, the container can be sealed in the crimping module and transferred directly to the external washing module for external washing.

In a further refinement, the isolator system comprises a transport device configured to discharge the container after exterior washing.

The removal of the containers can be designed in different ways. For example, the container can be pushed out into a magazine outside the isolator. Furthermore, the container can be placed on a conveyor belt with corresponding transport out of the isolator. Further, the container may be deposited into a transport screw with appropriate discharge out of the isolator. Furthermore, a unit may be provided by means of which the container is inserted into a nest which is transported out of the isolator with appropriate removal.

In a further refinement, the isolator system is configured such that the container is transferred back through the individual modules into the removal module after filling and stopper placing in the filling module or after capping in the crimping module or after external washing in the external washing module, wherein the removal module is configured to place the container back into the nest from which it was removed.

Preferably, the handling devices of the individual modules are designed to transfer the container from the filling module or from the crimping module or from the external washing module back to the removal module. In this way, for example, containers can be filled, closed or externally washed at the same time, while finished, in particular filled, closed, or externally washed, containers are transferred back in counterflow in the direction of the removal module. In particular, the individual transfer stations are designed to allow, especially simultaneously, transfer in both directions between the respective adjacent modules. For example, the handling devices can be controlled in such a way that they transfer a container still to be finished to a transfer station on the way forward, and remove a finished container from the transfer station on the way back and transfer it back. The simultaneous transfer of the containers in both directions can be referred to as the counterflow principle. After transferring back into the nest, the nest can be placed back into a transfer tray, which is then transferred out of the isolator by means of the transfer gate or another outlet. The counterflow principle does not affect the throughput of containers in the execution, or only insignificantly, since the handling devices travel on the return path with or without processed containers. By means of this counterflow principle, the containers can therefore be returned to the nest and discharged with it in a simple manner without the need for further handling devices.

In a further refinement, a partition is arranged between successive modules of the isolator system.

The individual modules are separated from each other by the partitions. The pressure ratios in the individual modules can be different. In particular, the pressure in the filling module can be higher than in the remaining modules. Preferably, there is an overpressure in each module. The partitions allow an individual pressure to be set in each module. In special applications, for example when processing toxic products, provision can be made for the pressure in the filling module to be lower than in the remaining modules.

In a further refinement, the respective transfer station for transferring the container between the corresponding modules is arranged in each partition.

A transfer of containers between the modules is thus only possible via the transfer stations. Each transfer station thus forms a transition between the modules separated by the respective partition wall.

In a further refinement, each module of the isolator system has at least two handling devices for handling the container in the corresponding module.

By means of two handling devices, the control steps in each module can be executed more quickly, since the respective process steps can be divided between the two handling devices. In this way, individual process steps can be carried out simultaneously when handling several containers, thus increasing the throughput rate, in particular doubling it.

In a further refinement, the isolator system further comprises decontamination device for decontaminating at least one module of the isolator system, wherein at least one module selected from a list comprising the filling module, the removal module, the crimping module, the freeze-drying module, the transferring module, and the external washing module is coupleable to the decontamination device to decontaminate at least the module.

The decontamination device can, for example, gasify the coupled module with hydrogen peroxide (H2O2) for decontamination. In this way, the corresponding module is decontaminated. If several modules are coupled and not isolated from each other, these modules can be decontaminated simultaneously, for example by gassing them together with hydrogen peroxide. The isolator system can have a ventilation device by means of which the defined atmosphere is generated in the isolator. The ventilation device is coupled to each module of the isolator system. The decontamination device may be coupled to the modules of the isolator system via the ventilation device to gas all modules simultaneously or only selectively gas individual modules with H2O2 to contaminate these modules. During initial decontamination at the start of production and/or at the end of production, the complete room is decontaminated across all modules.

In a further refinement, each transfer station is lockable to isolate the respective adjacent modules from each other.

In this way, the transfer station can be closed during decontamination in order to isolate a module to be decontaminated from the neighboring modules. This makes it possible to decontaminate a single module in a targeted manner, which is significantly faster than decontaminating the entire isolator system. This is particularly advantageous if contamination only occurs in a specific module and only this module needs to be decontaminated. The contamination of a single module may be necessary if there is a malfunction in the container handling process. In order to eliminate the malfunction manually, it may be necessary to open an isolator door to the corresponding module. By this opening, the interior of the isolator becomes unsterile. If the corresponding module is isolated from the other modules, only the corresponding module becomes unsterile when the isolator door is opened, so that only decontamination of the individual module is required, which then takes only a short period of time.

In another refinement, each transfer station includes at least one receptacle for receiving the container.

To transfer a container between two modules, the container can be inserted into the holder of the transfer station by means of a handling device of the transferring module and removed from the holder again by means of a further handling device of the receiving module. In this way, a simple transfer between modules is made possible.

In a further refinement, the receptacle is open in a transfer direction between the adjacent modules towards the adjacent modules, so that the container can be inserted into the receptacle by means of a handling device in the transfer direction and removed from the receptacle by means of a handling device in the transfer direction.

In this way, the container can be inserted into or removed from the fixture directly in the transfer direction without requiring movement perpendicular to the transfer direction. This allows the container to be easily transferred between two modules, simplifying handling and increasing the throughput rate.

In a further refinement, each transfer station includes a retaining device configured to hold the container in the respective receptacle.

If the container is arranged in the holder, the container is held by the retaining device. The container is held in such a way that the container can be inserted or removed in the transfer direction.

In a further refinement, each handling device of the plurality of handling devices of the filling module is configured such that it can handle at least two containers simultaneously, wherein the first and the second transfer stations are configured such that at least two containers can be transferred simultaneously, in particular wherein each transfer station has at least two receptacles for receiving one container each.

In this way, two containers can be handled simultaneously in the filling module. In particular, the filling station and the stoppering station can be designed so that two containers can be filled or stoppered at the same time. In this way, the throughput rate of the filling module is doubled. In particular, each handling device can have two gripping tools with which two containers can be gripped and transferred simultaneously.

In another refinement, each module is designed to handle two containers simultaneously.

For this purpose, each handling device can be designed in such a way that it can handle two containers simultaneously. In particular, each handling device can have two gripping tools with which two containers can be gripped and transferred simultaneously. Further, each transfer station may have at least two, preferably four or more, receptacles for receiving one container each. Further, each station of the modules may be configured to handle two containers simultaneously. For example, two containers can be removed from the nest in the removal station, two containers can be filled in the filling station, two stoppers can be placed on two containers in the stopper placing station, two containers can be capped in the crimping station, two containers can be inserted or removed in the freeze-dryer, and two containers can be exterior washed in the exterior washing module.

In a further refinement, the filling station comprises a filling needle for dispensing the liquid, wherein in the filling step the container is filled by means of the filling needle.

In other words, the filling needle releases the liquid into the container during filling. The filling needle can be arranged in the container or above an opening of the container for this purpose.

In another refinement, the filling needle is inserted into the container through an opening of the container for filling.

As a result, the filling needle is positioned in the container during filling. In this way, the container can be filled faster with less bubble formation at the same time.

In a further refinement, the control device is arranged to control the first handling device such that the following step is performed:

moving the container relative to the filling needle by means of the first handling device while the container is being filled.

In this way, bubble formation can be avoided during filling without the need for additional mechanics to perform a corresponding relative movement. This improves handling during the filling process and increases the throughput rate.

In a further refinement, at the beginning of the filling, a tip of the filling needle is arranged at the bottom of the container, and wherein in the moving step, the container is moved such that the tip of the filling needle is displaced from the bottom towards the opening of the container.

In this way, the tip of the filling needle can be kept on the surface of the liquid in the container during the filling process, thus avoiding the formation of bubbles.

In a further refinement, the filling station comprises a weighing device for weighing the container.

By means of the weighing device, the amount of liquid in the container can be controlled.

In a further refinement, the control device is arranged to control the first handling device such that the first handling device places the container on the weighing device for weighing before filling and/or after filling.

In this way, the amount of liquid dispensed into the container can be determined from the difference between the determined weight before and after filling and the density of the liquid, and compared with a setpoint value for control purposes.

In a further refinement, the weighing device is arranged below the filling needle.

In this way, weighing before and/or after filling takes place directly below the filling needle. The container can therefore either remain on the weighing device during filling or is merely moved relative to the filling needle by means of the first handling device. In this way, setup and handling are simplified. In addition, the container does not have to be transferred to a weighing device separated in space, which also increases the throughput rate.

In a further refinement, the filling station comprises a weighing device for weighing the container, the method further comprising the steps of:

first weighing of the container before filling the container by means of the weighing device; and/or second weighing of the container after filling the container by means of the weighing device.

In this way, the amount of liquid dispensed into the container can be determined from the difference between the determined weight before and after filling and the density of the liquid, and compared with a setpoint value for control purposes.

In a further refinement, the container is placed on the weighing device for weighing before filling and/or after filling by means of the first handling device.

As previously stated, this allows the amount of liquid dispensed into the container to be determined and compared to a set point for control purposes.

In a further refinement, the filling module further comprises a stopper placing station for placing a stopper on the filled container.

In other words, the stopper placing station is designed to insert a stopper into the opening of the container. The stopper closes the opening of the container.

In a further refinement, the method further comprises the following steps:

second transferring of the container from the filling station to a stopper placing station of the filling module by means of the first handling device and/or a second handling device; and placing a stopper on the container in the stopper placing station.

In this way, after the container has been filled, a stopper can be placed on the container to prevent liquid and/or gas from escaping from the container again during further processing of the container.

In a further refinement, the method further comprises the step of:

third transferring of the container from the stopper placing station to a second transfer station for transferring the container from the filling module by means of the second handling device.

In this way, two handling devices are used to transfer the container within the filling module. This increases the throughput rate in the filling module.

In a further refinement, the method further comprises the step of:

removal of the container to be filled from a nest by means of a removal module.

A plurality of containers to be filled is provided in a nest. The nest can be introduced into the isolator in a transport trough (tub) via a transfer lock. The transfer lock represents a plant inlet. The transfer lock can be designed as an H2O2 lock. In addition to an H2O2 airlock, there are other ways in which the transfer tray can enter the removal module. For example, decontamination chambers using electron beam, plasma beam, gamma beam or nitrogen dioxide processes may be used. It is also possible to work without sterilization procedures by pushing or transferring the transport tubs directly into the removal module after cutting open the outer bag. The transport tray can be inserted manually or mechanically into the transfer gate on the input side after an outer bag in particular has been cut open around it. Furthermore, the transport tray can be opened, the opened outer bag and/or an inner bag can be removed and/or the nest can be lifted out of the transport tray. With the airlock closed, the transport tray is then decontaminated, with nest if necessary, via hydrogen peroxide (H2O2) or one of the other methods above. Access to the removal module is then opened and processing begins. The removal module may include a removal station and a handling device. In the removal station, the nest may be held or parked, while the handling device removes each container individually from the nest, transfers it to the first transfer station, and places it therein for transfer to the filling module. The handling device can also be designed in such a way that it can remove several, in particular two, containers simultaneously from the nest and arrange them in the transfer station.

In a further refinement, the method further comprises the step of:

capping of the filled container by means of a crimping module.

The crimping module can have a crimping station and one or more handling devices for handling the filled container. In the crimping station, the container is closed by means of a lid, in particular an aluminum cap. For this purpose, the lid is placed on the opening of the container in the crimping station and crimped on the upper edge of the container. This process is therefore also referred to as "crimping". The crimping station may further include a feeder through which lids can be fed. The crimping station may be connected to a lid reservoir in which a plurality of lids are stored. The lid reservoir may have a singling device in which the lids are singled before they are fed singly via the feed to the crimping station. The filled container may be transferred from the second transfer gate to the crimping station by one or more of the handling device. Alternatively, the feeding can be done by loosely providing the lids on a plate. The position of the lids may be detected by a sensor device, such as a camera. The crimping station can have a robot that picks up a lid based on the detected position and feeds it to the crimping station or places it directly on the opening of the container. Furthermore, the crimping station can be designed in such a way that several, in particular two, containers can be closed simultaneously.

In a further refinement, the method further comprises the step of:
freeze-drying of the filled container by means of a freeze-drying module.

For this purpose, the freeze-drying module can have a freeze-dryer in which the container can be freeze-dried. Alternatively, the freeze-dryer can also be arranged outside the isolator, whereby the freeze-dryer can be coupled to the isolator, in particular to the freeze-drying module. The freeze-drying module may further comprise one or more handling devices for handling the filled container. By means of the handling devices, the container may be handled, in particular transferred, within the freeze-drying module. In particular, the container can be inserted into the freeze-dryer by means of one of the handling devices and removed from the freeze-dryer after freeze-drying. For filling the freeze-dryer, it can also be provided that one or more trays are loaded with containers to be freeze dried and the freeze-dryer is loaded therewith. After freeze-drying, the trays can be unloaded from the freeze-dryer and the freeze-dried containers removed from the tray. The freeze-dryer can be loaded with an entire batch or batch of containers. The freeze-drying process runs for several hours or days before the freeze-dryer is unloaded again.

In a further refinement, the method further comprises the step of:
transferring the filled container between the filling module, the crimping module and the freeze-drying module by means of a transferring module.

By means of the transferring module, the container can be transferred after filling either from the filling module to the crimping module or from the filling module to the freeze-drying module, depending on whether the container is to be freeze-dried. If the container is freeze-dried in the freeze-drying module, the container is transferred from the freeze-drying module to the crimping module after freeze-drying by means of the transferring module. The transferring module may include one or more handling devices for handling or transferring the container within the transferring module.

In a further refinement, the method further comprises the step of:
external washing of the sealed container by means of an external washing module.

By washing the outside of a container it is to be understood that the outside of the container is freed from impurities, in particular germs, liquid residues and/or powder residues, which have occurred during filling and/or freeze-drying and/or closing of the container. For example, for exterior washing, the container may be rinsed with a sterile liquid, particularly sterile water, and/or blown off with an inert gas or sterile air to remove the contaminants. For example, the external washing station may have an array of nozzles from which sterile water exits for cleaning and sterile air exits for drying. Preferably, cleaning agents, particularly caustic soda, are mixed with the sterile water.

In a further refinement, the method further comprises the step of:
removing of the container by means of a transport device after external washing.

The removal of the containers can be designed in different ways. For example, the container can be pushed out into a magazine outside the isolator. Furthermore, the container can be placed on a conveyor belt with corresponding transport out of the isolator. Further, the container may be deposited into a transport screw with appropriate discharge out of the isolator. Furthermore, a unit may be provided by means of which the container is inserted into a nest which is transported out of the isolator with appropriate removal.

In a further refinement, the method further comprises the step of:
returning the container to the nest from which it was removed, in particular wherein the container is transferred back to the removal module after filling and stopper placing in the filling module or after capping in the crimping module or after external washing in the external washing module through the individual modules, wherein the removal module is configured to place the container back into the nest from which it was removed.

Preferably, the handling devices of the individual modules are designed to transfer the container from the filling module or from the crimping module or from the external washing module back to the removal module. In this way, for example, containers can be filled, closed or externally washed at the same time, while finished, in particular filled, closed, or externally washed, containers are transferred back in counterflow in the direction of the removal module. In particular, the individual transfer stations are designed to allow, especially simultaneously, transfer in both directions between the respective adjacent modules. For example, the handling devices can be controlled in such a way that they transfer a container still to be finished to a transfer station on the way there, and remove a finished container from the transfer station on the way back and transfer it back. The simultaneous transfer of the containers in both directions can be referred to as the counterflow principle. After transferring back into the nest, the nest can be placed back into a transfer tray, which is then transferred out of the isolator by means of the transfer gate. The counterflow principle does not affect the throughput of containers in the execution, or only insignificantly, since the handling equipment travels down the return path with or without processed containers. By means of this counterflow principle, the containers can therefore be returned to the nest and discharged with it in a simple manner without the need for further handling equipment.

In a further refinement, the method further comprises the following steps:
coupling at least one module selected from a list comprising the filling module, the removal module, the crimping module, the freeze-drying module, the transferring module, and the external washing module with a decontamination device;
decontaminating the module by means of the decontamination device.

The decontamination device can, for example, gasify the coupled module with hydrogen peroxide ($H2O2$) for decontamination. In this way, the corresponding module is decontaminated. If several modules are coupled and not isolated from each other, these modules can be decontaminated simultaneously, for example by gassing them together with hydrogen peroxide. The isolator system can have a ventilation device by means of which the defined atmosphere is generated in the isolator. The ventilation device is coupled to each module of the isolator system. The decontamination device may be coupled to the modules of the isolator system via the ventilation device to gas all modules simultaneously or only selectively gas individual modules with H2O2 to contaminate these modules. In the initial decontamination at the start of production, the complete room is decontaminated across all modules.

In a further refinement, the method further comprises the step of:

closing each transfer station to the module to isolate the module from adjacent modules.

In this way, the transfer station can be closed during decontamination in order to isolate a module to be decontaminated from the neighboring modules. This makes it possible to decontaminate a single module in a targeted manner, which is significantly faster than decontaminating the entire isolator system. This is particularly advantageous if contamination only occurs in a specific module and only this module needs to be decontaminated. The contamination of a single module may be necessary if there is a malfunction in the container handling process. In order to eliminate the malfunction manually, it may be necessary to open an isolator door to the corresponding module. By this opening, the interior of the isolator becomes unsterile. If the corresponding module is isolated from the other modules, only the corresponding module becomes unsterile when the isolator door is opened, so that only decontamination of the individual module is required, which then takes only a short period of time.

In a further refinement, each transfer station comprises at least one receptacle for the container, the method further comprising the step of:

removing the container to be filled from the receptacle of the first transfer station by means of the first handling device; and inserting the filled container into the receptacle of the second transfer station by means of the second handling device.

To transfer a container between two modules, the container can be inserted into the holder of the transfer station by means of a handling device of the transferring module and removed from the holder again by means of a further handling device of the receiving module. In this way, a simple transfer between modules is made possible.

In a further refinement, the receptacle is configured to receive different containers having different geometries, and wherein the retaining device is configured to hold the different containers in the receptacle, in particular wherein the different containers have different diameters.

In this way, the transfer station is set up so that different container types can be transferred between the modules. This increases the flexibility of the system. In addition, various format parts can be dispensed with. Preferably, the containers, such as vials, syringes, bottles, cylindrical ampoules, are cylindrical in shape. In other words, these containers are circular cylindrical in cross-section. However, the diameters of the containers may be different. The retaining device can be variable or flexible in such a way that it can adapt to the diameter of the containers.

In another refinement, the retaining device comprises elastic elements arranged perpendicular to the transfer direction opposite the receptacle, the elastic elements being arranged to be pushed apart when a container is placed between the elastic elements.

In other words, the elastic elements are arranged so close together that when the container is inserted into the receptacle, the container pushes the elastic elements apart. Depending on the container diameter, the elastic elements are pressed apart accordingly. In this way, it is achieved, for example, that different containers with different geometries, in particular with different diameters, can be held in the receptacle by means of the retaining device. The clamping elements, in particular the clamping elements designed as spring elements or elastic elements, can form a prism into which the objects are inserted. When springing in, the prism contours shift in such a way that the theoretical center always remains in the center of the retaining device. In this way, objects with different diameters can be held in the same position by means of the clamping elements.

In a further refinement, the retaining device has a biasing device designed to clamp the container transversely, in particular perpendicularly, to the transfer direction.

In other words, the container is clamped in the receptacle perpendicular to the transfer direction when the container has been inserted into the receptacle. However, the insertion and removal of the container occurs in the transfer direction, so that the clamping of the container does not impede the insertion and removal of the container. In particular, the elastic elements can be designed to build up a biasing force when they are pressed apart perpendicular to the transfer direction.

In another refinement, the transfer station is configured to receive a plurality of containers, and wherein the transfer station includes a plurality of receptacles for receiving one container at a time.

In this way, several containers can be transferred simultaneously by means of the transfer station.

In another refinement, the number of the plurality of receptacles is an even number, particularly two, four, or six.

Using an even number of receptacles, an equal number of containers can be handled from both sides of the transfer station. For example, the second module can remove containers from half of the receptacles while the first module inserts containers into the other half of the receptacle. Alternatively, the same number of containers could be transferred in both directions, i.e. from the first to the second module and from the second to the first module, each in one half of the receptacles.

In another refinement, the transfer station is lockable to isolate the modules from each other.

In this way, the transfer station can be closed during a decontamination cycle, thereby isolating a module to be decontaminated from the neighboring modules. This makes it possible to decontaminate a single module in a targeted manner, which is significantly faster than decontaminating the entire isolator system. This is particularly advantageous if contamination only occurs in a specific module and only this module needs to be decontaminated.

It is understood that the above features and those to be explained below can be used not only in the combination indicated in each case, but also in other combinations or on their own, without departing from the scope of the present invention.

BRIEF DESCRIPTION OF THE SEVERAL VIEWS OF THE DRAWING

Embodiments of the application are shown in the drawing and are explained in more detail in the following description, where.

DETAILED DESCRIPTION

Figure 1:
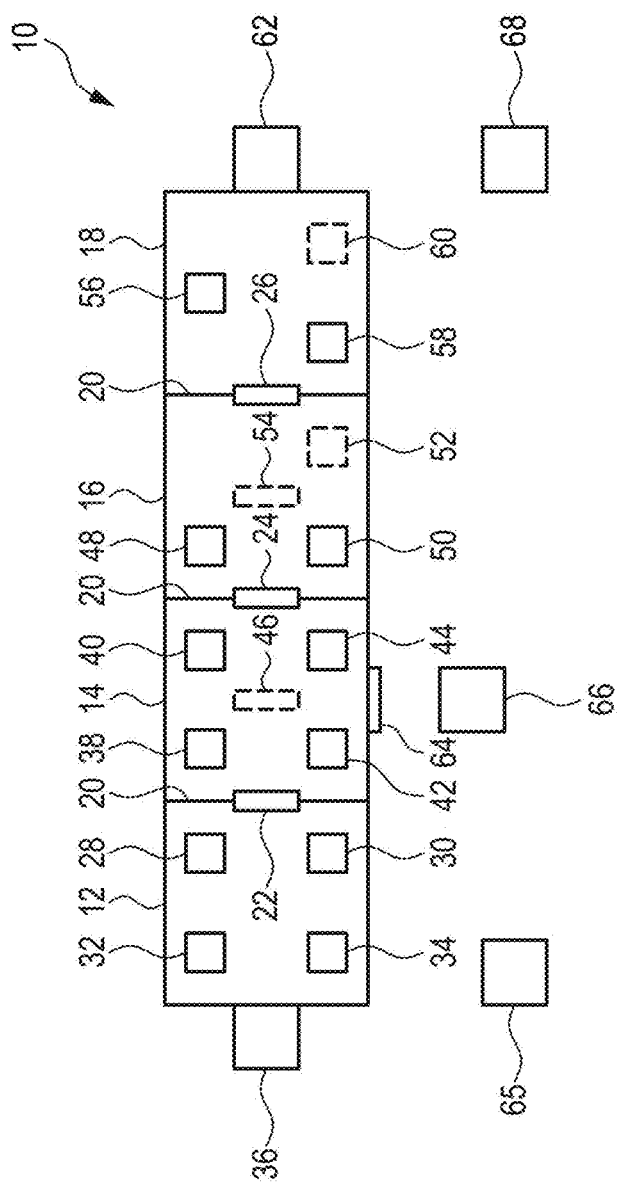
FIG. 1 is a schematic representation of a first embodiment of an isolator system.

FIG. 1 shows a first embodiment of an isolator system 10 for filling one or more containers. The isolator system 10 can be designed as an aseptic isolator, in particular as a clean room or ultra-clean room.

The isolator system 10 has a removal module 12, a filling module 14, a crimping module 16 and an external washing module 18. The filling module 14 is disposed between the removal module 12 and the crimping module 16. The crimping module 16 is arranged between the filling module 14 and the external washing module 18.

The modules 12, 14, 16, 18 are separated from each other by partition walls 20. A transfer station 22, 24, 26 is arranged in each partition wall, by means of which containers can be transferred between the adjacent modules. The transfer station 22 is arranged between the removal module 12 and the filling module 14. The transfer station 22 may also be referred to as the first transfer station. The transfer station 24 is arranged between the filling module 14 and the crimping module 16. The transfer station 24 may also be referred to as the second transfer station. The transfer station 26 is arranged between the crimping module 16 and the external washing module 18.

The isolator system 10 further comprises a control device 68. The control device 68 is arranged to control the functions of the individual modules 12, 14, 16, 18.

The removal module 12 is designed to remove one or more containers from a nest. For this purpose, the removal module 12 has a removal station 28 in which containers can be removed from the nest.

The removal module 12 further comprises a handling device 30. The handling device 30 is configured to handle one or more containers within the removal module. The control device 68 controls the handling device 30 such that the handling device 30 removes a container from the nest at the removal station 28 and transfers the container to the transfer station 22. In particular, the control device 68 may control the handling device 30 such that the containers are sequentially removed from the nest and transferred to the transfer station 22.

The removal module 12 is adjacent to a transfer lock 36, in which a nest of containers may be provided to the removal module 12. The nest may be arranged in a transport tray. The transport tray may be sealed by means of a film. The transfer lock can be designed as an H2O2 lock, in which a transport tray inserted into the isolator can be decontaminated by means of H2O2 gassing.

For removing the foil, the removal module 12 further comprises an unpacking station 32. For example, the film can be removed from the transport tray in the unpacking station 32.

The removal module 12 may further comprise one or more further handling devices 34, by means of which the nest can be handled within the removal module 12. By means of the handling devices 34, the transport tray with the nest packed therein can be transferred from the transfer gate to the unpacking station. After removal of the film, the transport tray with nest can be transferred to the removal station 28. Before the handling device 30 removes individual containers from the nest, the nest can be removed from the transport tray by means of the handling devices 34.

The filling module 14 is designed to fill one or more containers with a liquid. For this purpose, the filling module 14 has a filling station 38 in which a container can be filled. For this purpose, the filling station 38 can have one or more filling needles for dispensing the liquid.

The filling module 14 further comprises a stopper placing station 40, in which a stopper can be placed on one or more containers. For this purpose, the stopper placing station 40 has means for inserting a stopper.

The filling module 14 further comprises a first handling device 42 and a second handling device 44. The handling devices 42, 44 are designed to handle one or more containers within the filling module 14.

The control device 68 controls the first handling device 42 such that the first handling device 42 removes a container from the first transfer station 22 and transfers it to the filling station. In the filling station, the container is filled. The control device 68 controls the filling station 38 to fill the container. After filling, the control device 68 controls the first and/or the second handling device 42, 44 such that the filled container is transferred from the filling station 38 to the stopper placing station. A stopper is placed on the container in the stopper placing station 40. The control device 68 controls the stopper placing station 40 to place the stopper. After the stopper is placed, the control device 68 controls the second handling device 44 such that the second handling device 44 transfers the container from the stopper placing station 40 to the second transfer station 24 and delivers the container to the second transfer station 24.

An intermediate station 46 can be arranged between the filling station 38 and the stopper placing station 40, which is designed as a transfer station. For transferring the container from the filling station 38 to the stopper placing station 40, the control device 68 can control the first and second handling devices 42, 44 in such a way that the first handling device 42 transfers the container from the filling station 38 to the intermediate station 46 and the second handling device 44 transfers the container from the intermediate station 46 to the stopper placing station 40.

The crimping module 16 is designed to seal one or more containers. For this purpose, the crimping module 16 has a crimping station 48 in which one or more containers can be closed. In particular, the containers can be closed in the crimping station 48 by means of a lid, in particular an aluminum cap. For this purpose, the lid is placed on the opening of the corresponding container in the crimping station 48 and is crimped on the upper edge of the container.

The crimping module 16 further comprises a handling device 50 by means of which one or more containers can be handled within the crimping module 16. In addition, the crimping module 16 can also have a further handling device 52 by means of which a container can additionally be handled within the crimping module 16.

The control device 68 controls the handling device 50 such that the handling device removes a filled container from the transfer station 24 and transfers it to the crimping station 48. In the crimping station 48, the container is sealed. The control device 68 controls the crimping station 48 to seal the container. After the container is sealed, the control device 68 controls the handling devices 50, 52 such that one of the handling devices 50, 52 transfers the container from the crimping station 48 to the transfer station 26 and delivers it to the second transfer station 26.

An intermediate station 54 can be arranged between the crimping station 48 and the transfer station 26, which is designed as a transfer station. To transfer the container from the crimping station 48 to the transfer station 26, the control device 68 can control the handling devices 50, 52 in such a way that the handling device 50 transfers the container from the crimping station 48 to the intermediate station 54 and the handling device 52 transfers the container from the intermediate station 46 to the transfer station 26.

The external washing module 18 is configured to externally wash one or more containers. For this purpose, the external washing module 18 has an external washing station 56 in which one or more containers can be washed externally.

The external washing module 18 further comprises a handling device 58 by means of which one or more containers may be handled within the external washing module 18. In addition, the external washing module 18 may also include a further handling device 60 by means of which one or more containers may additionally be handled within the external washing module 18.

The external washing module 18 can be adjacent to a transfer lock 62 from which one or more containers can be discharged. The discharged container can then be removed via a further transport device. Instead of discharging the containers via a transfer lock, it may be provided that the containers are discharged into a magazine outside the isolator. Alternatively, the containers can be deposited onto a conveyor with appropriate discharge out of the isolator. Furthermore, the containers can also be deposited into a transport screw with corresponding discharge out of the isolator. Furthermore, a unit can also be provided by means of which the container is inserted into a nest, which is transported out of the isolator with corresponding removal.

The control device 68 controls the handling device 58 such that the handling device 58 removes a sealed container from the transfer station 24 and transfers it to the external washing station 56. At the external washing station 56, the container is washed externally. After the exterior wash, the control device 68 controls one of the handling devices 58, 60 such that one of the handling devices 58, 60 transfers the container from the exterior wash station 56 to the transfer gate 62 and places it therein.

The filling module 14 may comprise a door 64. Via the door 64, an access from the outside into the isolator system 10, in particular into the filling module 14, is provided. The door 64 can be used to manually intervene in the filling module 14, for example if there is a malfunction in the filling module 14.

The isolator system 10 may further comprise a ventilation device 65, by means of which a defined atmosphere can be generated in the isolator system.

Each of the modules of the isolator system 10 may be coupled to a decontamination device 66. The decontamination device 66 is configured to decontaminate the module to which it is coupled. For example, the decontamination device 66 may gas the corresponding module with hydrogen peroxide for this purpose. The control device 68 may control the decontamination device 66. Preferably, the decontamination device 66 may be coupled to the individual modules via the ventilation device 65 to gas the individual modules with hydrogen peroxide.

Figure 2:
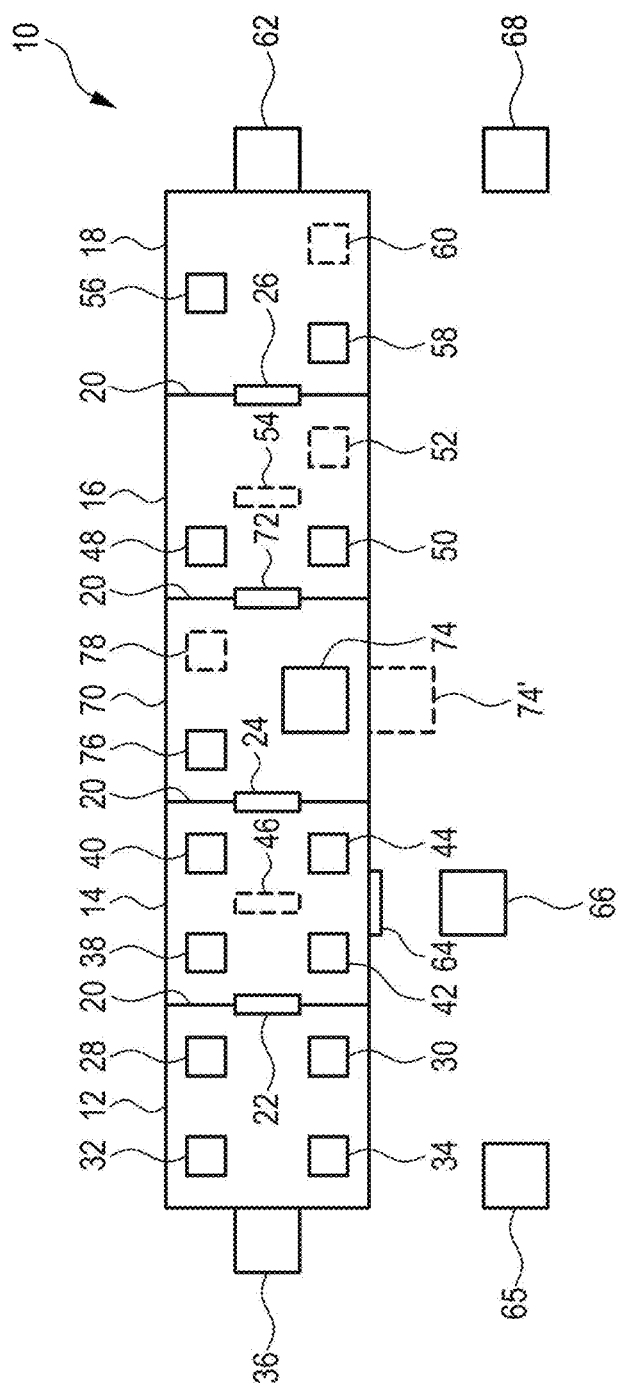
FIG. 2 is a schematic representation of a second embodiment of an isolator system.

FIG. 2 shows a second embodiment of the isolator system 10. The isolator system 10 of the second embodiment has substantially the same elements as the isolator system 10 of the first embodiment. Like elements are indicated by like reference numerals and are not explained in further detail.

The isolator system 10 of the second embodiment additionally comprises a freeze-drying module 70. The freeze-drying module 70 is arranged between the filling module 14 and the crimping module 16.

The transfer station 24 is arranged between the filling module 14 and the freeze-drying module 70. Another transfer station 72 is arranged between the freeze-drying module 70 and the crimping module 16.

The freeze-drying module 70 is configured to freeze-dry one or more containers. For this purpose, the freeze-drying module 70 comprises a freeze-dryer 74. The freeze-dryer 74 is configured to freeze dry filled containers.

Alternatively, the freeze-dryer 74 may be disposed outside the freeze-drying module 70, particularly outside the isolator, with the freeze-dryer 74 coupled to the freeze-drying module 70. The freeze-drying module 70 may be configured to load the freeze-dryer 74 with containers to be freeze dried, and to unload the freeze-dried containers from the freeze-dryer after freeze-drying.

The freeze-drying module 70 further comprises a handling device 76 by means of which one or more containers may be handled within the freeze-drying module 70. In addition, the freeze-drying module 70 may also comprise a further handling device 78 by means of which a container may additionally be handled within the freeze-drying module 70.

The control device 68 controls the handling device 76 such that the handling device 76 removes a filled container from the transfer station 24 and transfers it to the freeze-dryer 74. Preferably, the handling device 76 places the container into the freeze-dryer 74 in the process. In the freeze-dryer 74, the container is freeze dried. After freeze-drying, the control device 68 controls one of the handling devices 76, 78 such that one of the handling devices 76, 78 transfers the container from the freeze-dryer 74 to the transfer station 26 and places it therein.

Figure 3:
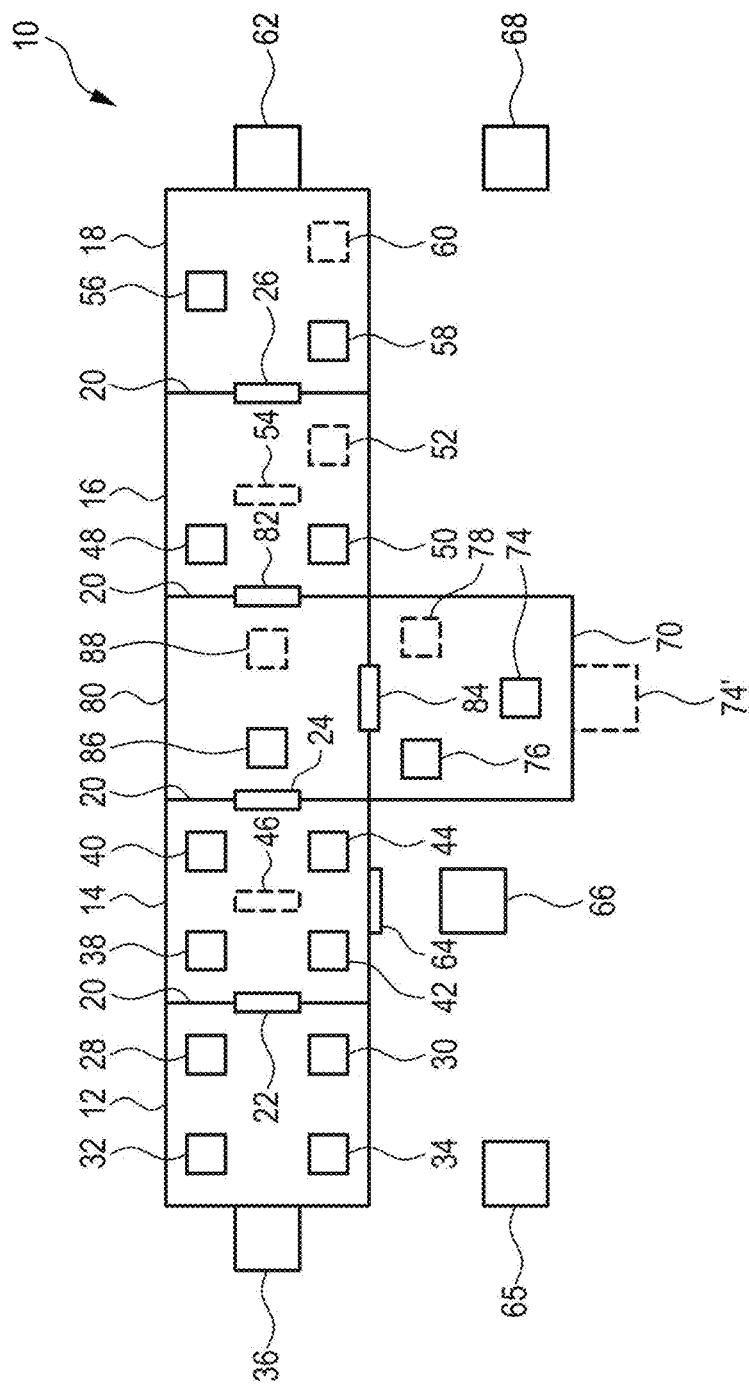
FIG. 3 is a schematic representation of a third embodiment of an isolator system.

FIG. 3 shows a third embodiment of the insulator system 10. The insulator system 10 of the third embodiment has substantially the same elements as the insulator system 10 of the second embodiment. Like elements are indicated by like reference numerals and are not explained in more detail.

The isolator system 10 of the third embodiment further comprises a transferring module 80 disposed between the filling module 14, the crimping module 16, and the freeze-drying module 70.

The transfer station 24 is arranged between the filling module 14 and the transferring module 80. Another transfer station 82 is arranged between the transferring module 80 and the crimping module 16. Another transfer station 84 is arranged between the transferring module 80 and the freeze-drying module 70.

The transferring module 80 is configured to transfer one or more containers between the filling module 14, the crimping module 16, and the freeze-drying module 70.

For this purpose, the transferring module 80 comprises a handling device 86 by means of which a container can be handled within the transferring module 80. In addition, the transferring module 80 can also have a further handling device 88 by means of which a container can additionally be handled within the transferring module 80.

Only a single transfer station 84 is adjacent to the freeze-drying module 70 in the third embodiment of the isolator system 10. Accordingly, the handling device 76 removes a filled container from the transfer station 84 and transfers the container to the freeze-dryer 74 for freeze-drying. After freeze-drying, the container is transferred back to the transfer station 84 by means of one of the handling devices 76, 78.

In FIGS. 1 to 3, it may also be envisaged that after filling and placing in the filling module 14 or sealing in the crimping module 16 or after external washing in the external washing module 18, the containers are transferred back to the removal module 12 in order to reinsert the containers into the nest from which they were removed. For this purpose, the containers can be transferred in the opposite direction by means of the handling devices of the individual modules.

In FIGS. 1 to 3, each module 12, 14, 16, 18, 70, 80 may be configured to handle two or more containers simultaneously. To this end, each handling device 30, 42, 44, 50, 52, 58, 60 may be configured to handle two containers simultaneously. In particular, each handling device, 42, 44, 50, 52, 58, 60 may include two gripping tools capable of gripping and transferring two containers simultaneously. Further, each transfer station 22, 24, 26, 72, 82, 84 may include at least two, preferably four or more, receptacles for receiving one container at a time. Further, each station of modules 12, 14, 16, 18, 70, 80 may be configured to handle two containers simultaneously. For example, two containers can be removed from the nest in the removal station 28, two containers can be filled in the filling station 38, two stoppers can be placed on two containers in the stopper placing station 40, two containers can be capped in the crimping station 48, two containers can be inserted or removed in the freeze-dryer 74, and two containers can be washed externally in the external washing station 56.

Figure 4:
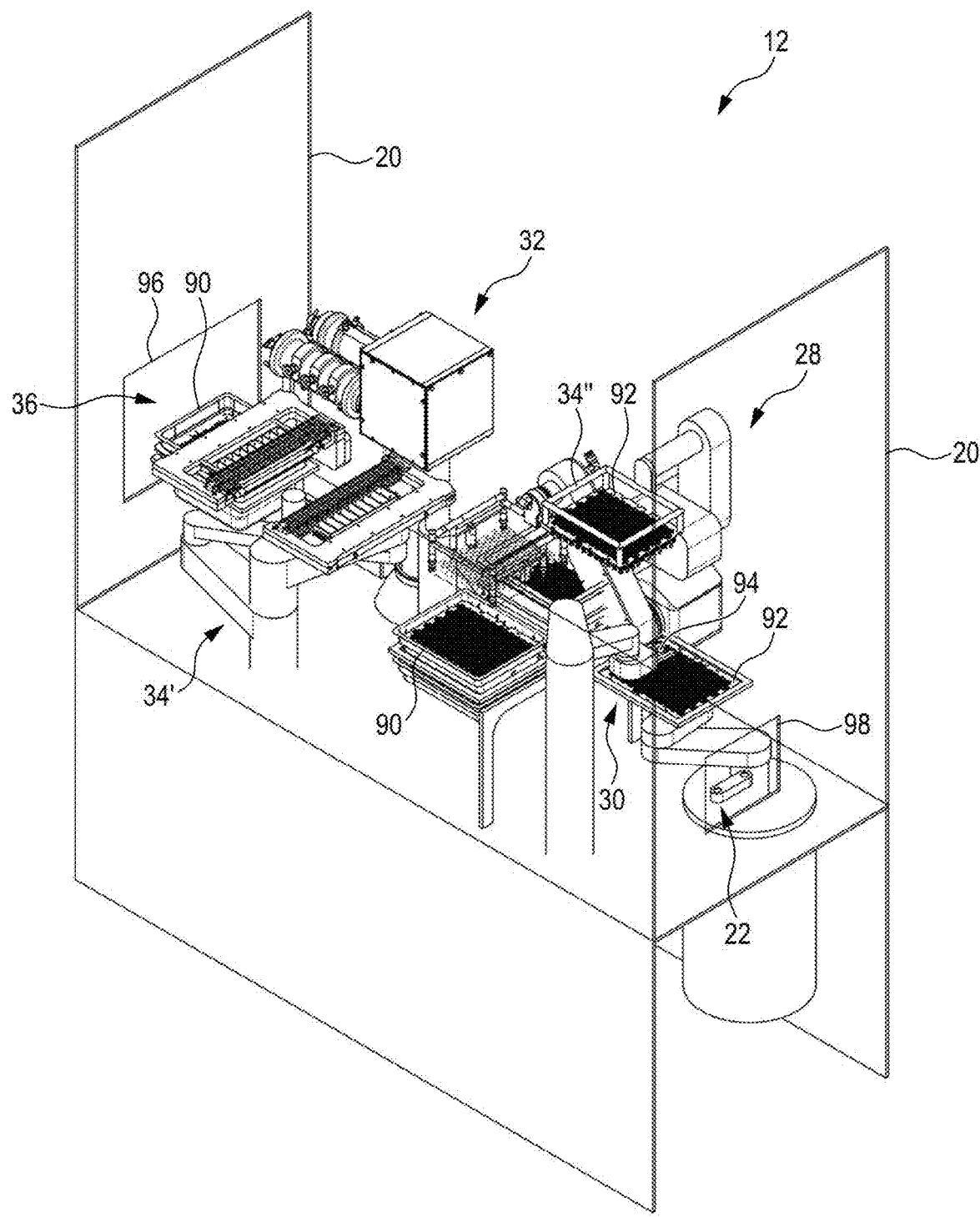
FIG. 4 is an isometric view of an embodiment of a removal module.
Figure 5:
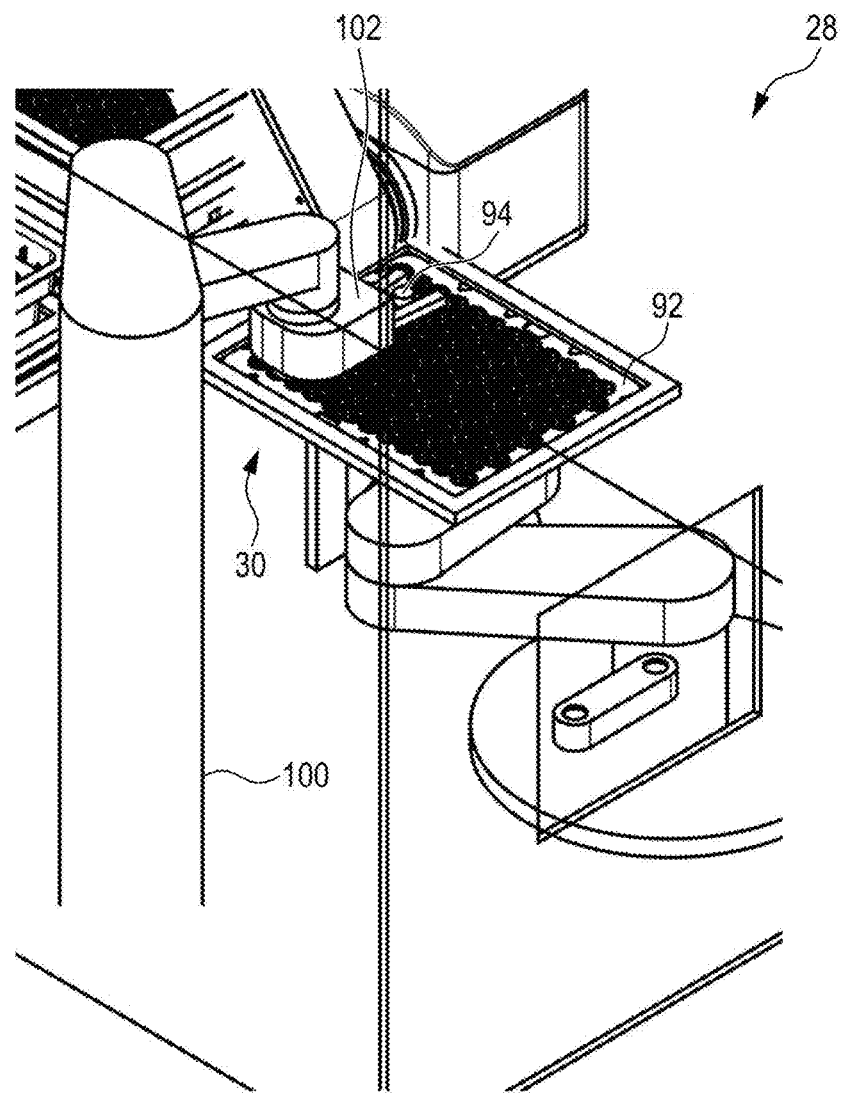
FIG. 5 is an isometric view of a removal station of the removal module of FIG. 4.

FIG. 4 shows an embodiment of a removal module 12 of the isolator system 10. FIG. 5 shows the removal station 28 of the removal module 12 in detail.

The removal module 12 has two handling devices 34', 34" for handling the nests. The handling devices 30, 34' and 34" are designed as robots. The handling devices 30, 34' and 34" each comprise an end effector 102 by means of which the transport tray 90, the nest 92 and/or the containers 94 can be handled. Furthermore, the handling devices 30, 34' and 34" each comprise a support structure 100 by means of which the corresponding end effector 102 is movable in the removal module 12. For gripping the containers 94, the end effector 102 of the handling device 30 may comprise, for example, a gripping tool. The gripping tool is preferably configured such that two containers 94 can be gripped and transferred simultaneously.

The removal module 12 is separated from the transfer gate 36 by means of a partition wall 20. The partition wall 20 has an opening 96 through which the removal module 12 is connected to the transfer gate 36. The opening 96 may be closable to isolate the transfer gate 36 and the removal module 12 from each other.

Through the opening 96, a handling device 34' of the handling devices 34 can remove a transport tray 90 provided in the transfer gate 36 and transfer it to the unpacking station 32. A nest 92 is disposed in each transport tray 90. A plurality of containers 94 are disposed in each nest 92. Each transport tray 90 provided in the transfer gate 36 is sealed with a film.

In the unpacking station 32, the film is removed from the transport tub 90 in order to unpack, in particular to open, the transport tub 90. After unpacking, the handling device 34' further transfers the unpacked transport tub 90 to the removal station 28. The handling device 34' can place the transport tub 90 in a holder in the removal station 28. By means of a handling device 34" of the handling devices 34, the nest 92 can be removed from the transport tub 90 and transferred to and deposited in a further holder of the removal station 28.

The removal module 12 is separated from the filling module 14 by means of a partition wall 20. The partition wall 20 has an opening 98 through which the removal module 12 is connected to the filling module 14. The transfer station 22 is arranged in the opening 98. The transfer station 22 may have at least one receptacle for receiving a container 94. In particular, the transfer station 22 has at least two receptacles.

By means of the handling device 30, the containers 94 are removed from the nest 92 and transferred to the transfer station 22. The handling device 30 can arrange the removed containers 94 in a respective receptacle in the transfer station 22. At the transfer station 22, the containers are transferred from the removal module 12 to the filling module 14. In particular, the containers 94 can be removed from the nest 92 individually or in pairs by the handling device 30 and transferred to the transfer station 22.

After all containers 94 have been removed from the nest 92, the handling device 34" can be used to place the empty nest 92 back into the associated transport tray 90. The transport tub 90 can then be transferred by means of the handling device 34' to the transfer lock 36 or to a further (not shown) transfer lock in order to discharge the transport tub 90 with empty nest 92 from the removal module. Alternatively, provision may be made for filled, sealed and/or externally washed containers 94 to be introduced back into the removal module via the transfer station 22 to place these containers back into the nest 96 from which they were removed. Then, the nest that has been refilled with containers can be discharged by means of the handling devices 34', 34".

Figure 6:
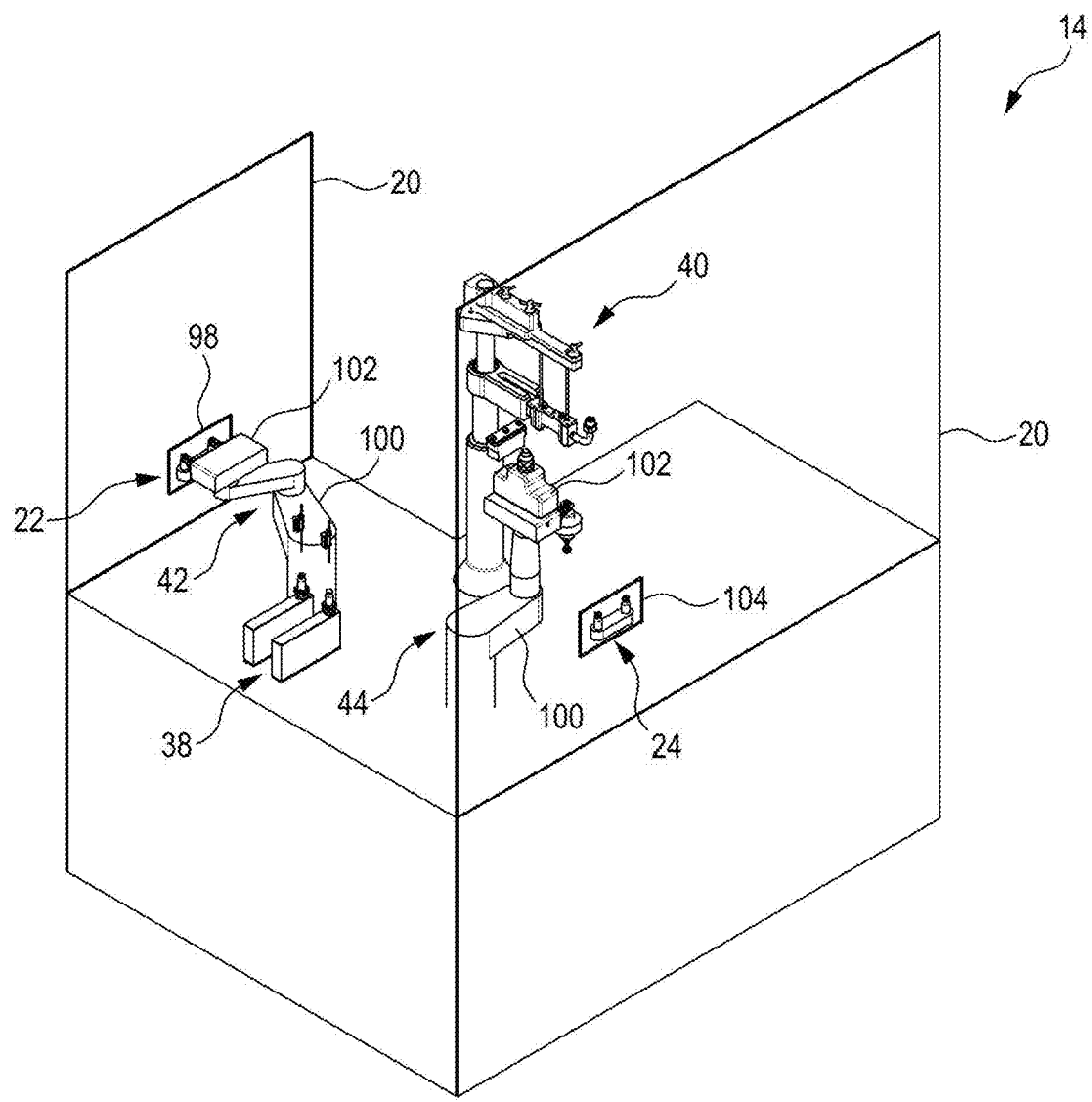
FIG. 6 is an isometric view of an embodiment of a filling module.
Figure 7:
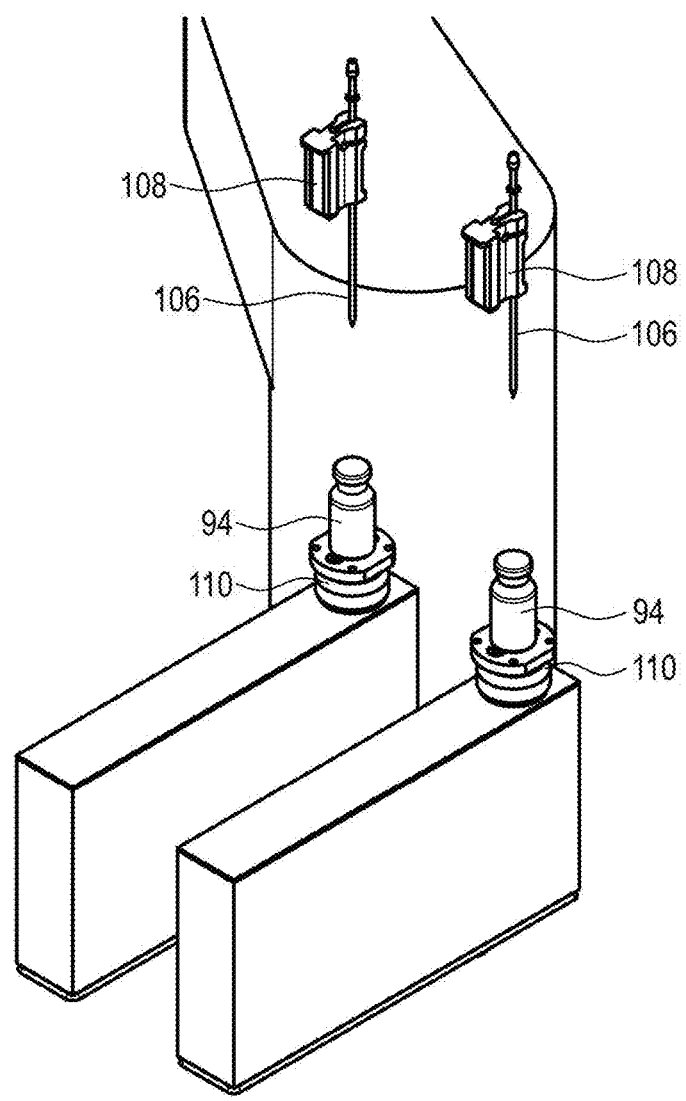
FIG. 7 is an isometric view of a filling station of the filling module of FIG. 6.
Figure 8:
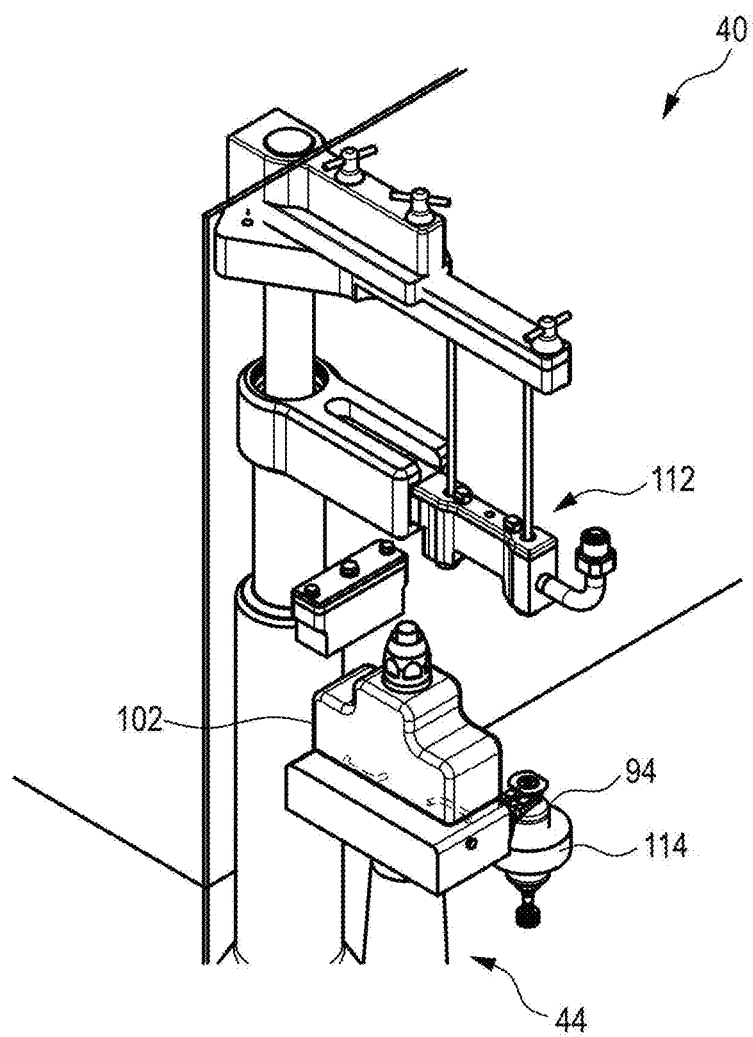
FIG. 8 is an isometric view of a stopper placing station of the filling module of FIG. 6.

FIG. 6 shows an embodiment of a filling module 14 of the isolator system 10. In FIG. 7, the filling station 38 of the filling module 14 is shown in detail. In FIG. 8, the stopper placing station 40 of the filling module 14 is shown in detail.

The handling devices 42 and 44 are designed as robots. The handling devices 42 and 44 each have an end effector 102 by means of which the containers 94 can be handled. Furthermore, the handling devices 42 and 44 each have a carrier structure 100 by means of which the corresponding end effector 102 can be moved in the filling module 14. For gripping the containers 94, the end effector 102 of the handling devices 42 and 44 may comprise, for example, a gripping tool. The gripping tool is preferably configured such that two containers 94 can be gripped and transferred simultaneously.

By means of the handling device 42, the containers 94 are transferred from the transfer station 22 to the filling station. In particular, the handling device 42 can be used to remove the containers 94 either individually or in pairs from the transfer station 22 and transfer them to the filling station.

The filling station 38 includes two filling needles 106, two filling needle holders 108 for holding the filling needles 106, two metering devices (not shown), and two weighing devices 110. Each filling needle 106 is configured to dispense liquid into a container 94. To dispense the liquid, each filling needle 106 can either be positioned above an opening of the container 94 or inserted into the container 94 through the opening. Each dispensing device is configured to control the amount of liquid to be dispensed from a respective filling needle 106. The filling needles may be connected to a tank that serves as a fluid reservoir. Each metering device is arranged in a fluid path between the tank and the corresponding filling needle 106. Each weighing device 110 is configured to determine the weight of a container 94 placed on the weighing device 110. Each weighing device 110 is arranged below a respective filling needle 106.

By means of the handling device 42, the containers 94 may be placed individually or in pairs on the weighing device 110 and weighed prior to filling. After weighing, the first handling device 42 can lift the weighed containers 94 again and move them upwards in the direction of the respective filling needle 106 in order to insert the filling needle 106 into the respective container 94 to be filled. The filling needle 106 may be inserted into the container 94 until a tip of the filling needle 106 is located at the bottom of the container 94. In this context, at the bottom means that the tip is either placed on the bottom or is arranged near the bottom. In particular, the tip of the filling needle may be arranged just above the bottom. A distance between the tip of the filling needle 106 and the bottom of the container 94 may be between at least 1 mm and 2 cm, preferably between 2 mm and 1 cm, in particular 3 mm.

During the filling operation, the container 94 is moved downward again by the handling device 42 so that a distance between the bottom of the container 94 and the tip of the filling needle 106 increases. In other words, the filling needle 106 is pulled out of the container 94 during filling.

After filling, each container 94 is again placed on the weighing equipment 110 and weighed a second time. The fill quantity can be determined from the difference in weight between the first and second weighing of a container. The determined fill quantity can be compared with a target fill quantity for quality control.

By means of the handling device 42 and/or the handling device 44, the containers can be transferred individually or in pairs from the filling station 38 to the stopper placing station 40.

The stopper placing station 40 has a stopper placing device 112, by means of which a stopper can be placed on a container. The stopper placing device 112 can also be used to place two stoppers on two containers at the same time. The stopper placing station 40 may further comprise two holders 114 for two containers 94. The holders 114 are arranged below the stopper placing device 112.

By means of the handling device 42 and/or the handling device 44, the containers are placed individually or in pairs under the stopper placing device 112. For this purpose, one container can be placed on each holder. The stopper placing device 112 then places one stopper on each container in turn. Alternatively, the stopper placing device 112 may place two stoppers at a time on each of two containers 94 arranged in the stopper placing station 40.

The filling module 14 is separated from the downstream module by means of a partition wall 20. The subsequent module can be the crimping module 16, the freeze-drying module 70 or the transferring module 80. The partition wall 20 has an opening 104 through which the filling module 14 is connected to the subsequent module. The transfer station 24 is disposed in the opening 104. The transfer station 24 may include at least one receptacle for receiving a container 94. In particular, the transfer station 24 has at least two receptacles.

By means of the handling device 44, the containers 94 are transferred individually or in pairs from the stopper placing station 40 to the transfer station 24 after placing. The handling device 44 can arrange the containers 94 in the transfer station 24 in a respective receptacle. In the transfer station 24, the containers are transferred from the filling module 14 to the subsequent module.

Figure 9:
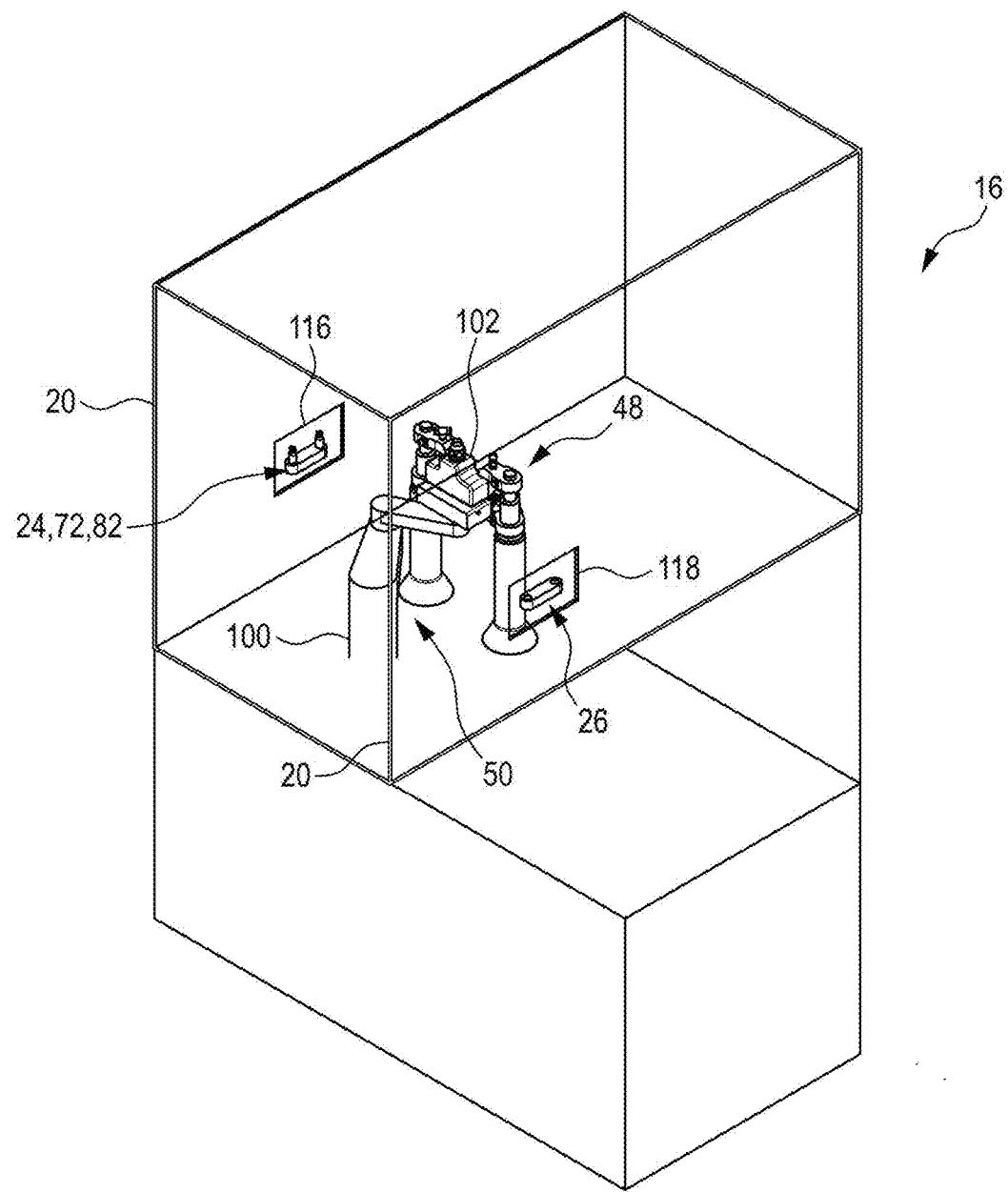
FIG. 9 is an isometric view of an embodiment of a crimping module.
Figure 10:
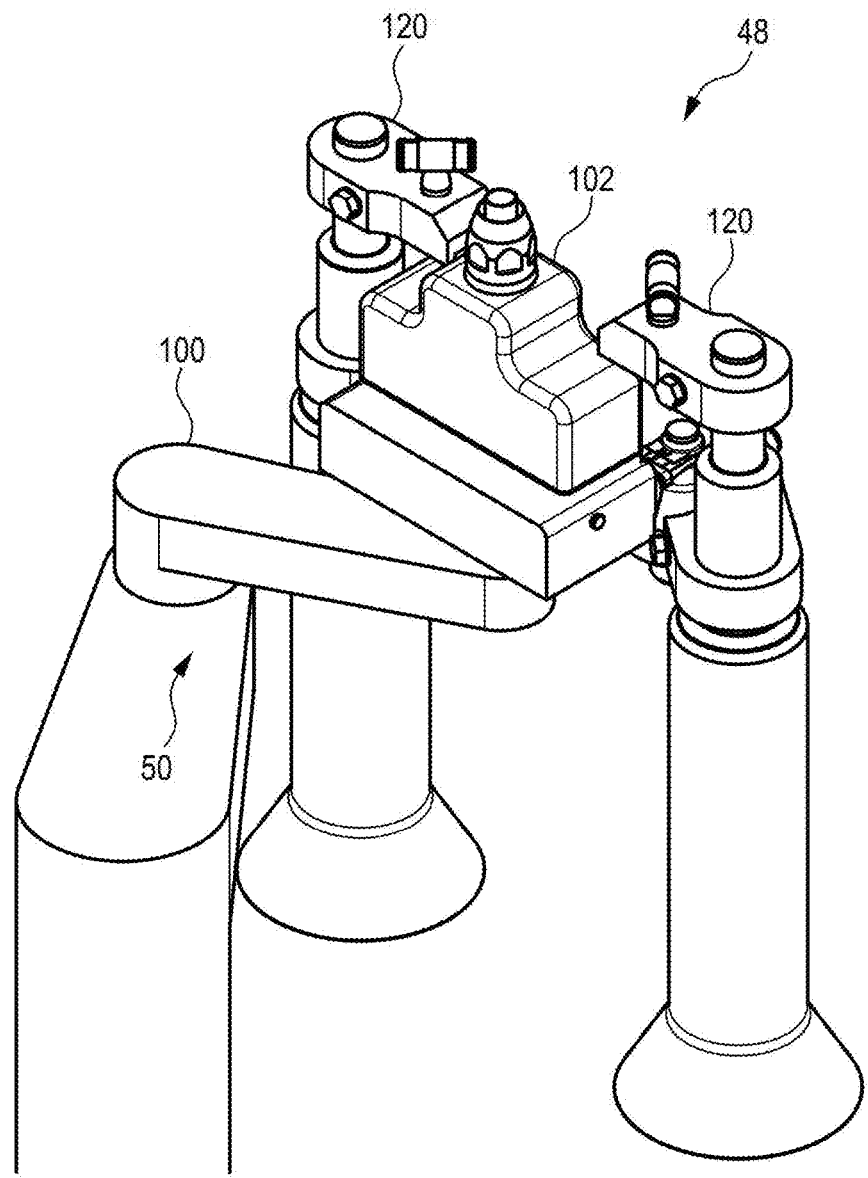
FIG. 10 is an isometric view of a crimping station of the crimping module from FIG. 9.

FIG. 9 shows an embodiment of a crimping module 16 of the isolator system 10. FIG. 10 shows the crimping station 48 of the crimping module 16 in detail.

The handling device 50 is designed as a robot. The handling device 50 has an end effector 102 by means of which the containers 94 can be handled. Furthermore, the handling device 50 has a carrier structure 100 by means of which the corresponding end effector 102 can be moved in the filling module 14. For gripping the containers 94, the end effector 102 of the handling device 50 may comprise, for example, a gripping tool. The gripping tool is preferably configured such that two containers 94 can be gripped and transferred simultaneously.

By means of a partition wall 20, the crimping module 16 is separated from the previous module. The previous module can be the filling module 14, the freeze-drying module 70 or the transferring module 80. The partition wall 20 includes an opening 116 through which the crimping module 16 is connected to the previous module. The corresponding transfer station 24, 72, 82 to the previous module is disposed in the opening 116. The transfer station 24, 72, 82 may include at least one receptacle for receiving a container 94. In particular, the transfer station 24, 72, 82 has at least two receptacles.

By means of the handling device 50, the containers 94 are transferred from the transfer station 24, 72, 82 to the crimping station 48. In particular, the handling device 50 can remove the containers 94 either individually or in pairs from the transfer station 24, 72, 82 and transfer them to the crimping station 48.

In the crimping station 48, the containers 94 are closed individually or in pairs one after the other. In particular, the containers 94 can be closed in the crimping station 48 by means of a lid. For this purpose, the lid is placed on the opening of the container 94 in the crimping station 48 and is crimped on the upper edge of the container 94. For this purpose, the crimping station 48 may comprise two crimping devices 120. Each crimping device 120 is configured to seal a respective container 94.

The crimping module 16 is separated from the external washing module 18 by means of a partition wall 20. The partition wall 20 has an opening 118 through which the crimping module 16 is connected to the external washing module 18. The transfer station 26 is disposed in the opening 118. The transfer station 26 may include at least one receptacle for receiving a container 94. In particular, the transfer station 26 has at least two receptacles.

By means of the handling device 50 or the (not shown) handling device 52, the containers 94 are transferred individually or in pairs from the crimping station 48 to the transfer station 26 after crimping. The handling device 50 can arrange the containers 94 in the transfer station 26 in a respective receptacle. In the transfer station 26, the containers are transferred from the filling module 14 to the external washing module 18.

FIGS. 11 to 15 show one embodiment of a transfer station 130. Each transfer station 22, 24, 26, 72, 82, 84 of the isolator system 10 of FIGS. 1 to 3 may be configured according to the transfer station of FIGS. 11 to 15.

The transfer station 130 may be arranged in an opening 132 of a partition wall 20 between two modules. The transfer station 130 is designed so that at least one container 94 can be transferred between a first module and a second module. In particular, the transfer station 130 may be configured to allow a plurality of containers 94 to be transferred simultaneously by means of the transfer station 130.

The containers 94 are transferred in a transfer direction 140 from the first module to the second module.

The partition wall 20 is arranged transversely, preferably perpendicular to the transfer direction 140 and extends in a vertical direction 144 and a horizontal direction 142. The vertical direction 144 and the horizontal direction 142 are arranged transversely, preferably perpendicular to the transfer direction 140. The opening 132 also extends in the vertical direction 144 and the horizontal direction 142. In other words, the opening 132 in the partition wall 20 forms a recess through which the containers 94 can be passed in the transfer direction 140.

For this purpose, the transfer station 130 has at least one receptacle 134 for receiving a container 94. In particular, the transfer station 130 can have a plurality of receptacles 134 for receiving one container 94 each. In the embodiment shown, the transfer station 130 has four receptacles 134.

Each receptacle 134 is open towards both modules in the transfer direction 140. As a result, one container 94 at a time can be inserted in the transfer direction 140 into the respective receptacle 134 by means of a handling device of the first module. Likewise, one container 94 at a time can be removed in the transfer direction 140 from the respective receptacle 134 by means of a handling device of the second module. In other words, each receptacle 134 is open on both sides in the transfer direction 140 so that a container 94 can be inserted into and removed from the receptacle 134 in the transfer direction 140.

Each receptacle 134 is U-shaped. Each receptacle has two side surfaces and a bottom surface. The two side surfaces are spaced apart in the horizontal direction 142. The bottom surface is arranged between side surfaces and forms a lower end of the receptacle 134 with respect to the vertical direction 144. The upper end of the receptacle 134 is open. A distance between the side surfaces in the horizontal direction 142 is such that a container 94 can be disposed between the side surfaces.

Each receptacle 134 is further configured such that different containers 94 (for example, syringes, vials, bottles, cylindrical ampoules, and the like) having different geometries can be received in each receptacle 134. In particular, the spacing of the side surfaces in the horizontal direction 142 is such that containers 94 having different diameters can be received in each receptacle 134.

The transfer station 130 further comprises, for each receptacle 134, a retaining device 136 for holding the container 94 in the corresponding receptacle 134. The retaining device comprises a biasing means configured to clamp the container 94 transversely, preferably perpendicularly, to the transfer direction 140. In particular, the biasing means may be configured to clamp the container 94 in the horizontal direction 142. By clamping, the containers 94 assume a defined position in space, in particular in the spatial directions 140, 142, 144. The transfer can take place via this defined position.

The biasing means of each retaining device 136 is formed by a first clamping element 138' and a second clamping element 138". The clamping elements 138', 138" are spaced apart in a clamping direction. The clamping direction is arranged transversely, preferably perpendicularly, to the transfer direction 140. In particular, the clamping direction may be arranged parallel to the horizontal direction 142. The clamping elements 138', 138" are arranged at the upper end of the respective receptacle 134.

The clamping elements 138', 138" are elastic at least in the horizontal direction 142. The clamping elements 138', 138" can therefore also be referred to as elastic elements. The clamping elements 138', 138" may, for example, be formed as spring elements arranged such that a distance between the clamping elements 138', 138" in the horizontal direction 142 can be varied with respect to a rest state. The clamping elements 138', 138" are thereby biased towards the rest state. The clamping elements can be designed in particular as triangular brackets, the brackets of the clamping elements 138', 138" being arranged mirror-symmetrically with respect to one another. In particular, blunt corners of the brackets are arranged opposite each other. The clamping elements 138', 138", in particular the clamping elements 138', 138" formed as spring elements or elastic elements, can form a prism into which the objects are inserted, as can be seen in the top view of FIG. 12B. When springing in, the prism contours shift in such a way that the theoretical center always remains in the center of the retaining device. In this way, objects with different diameters can be held in the same position by means of the clamping elements 138', 138".

The distance of the clamping members 138', 138" in the horizontal direction 142 is smaller than a distance of the side surfaces of the receptacle 134 in the horizontal direction 142 in the rest state. Further, the distance of the clamping members 138', 138" in the horizontal direction 142 may be equal to or smaller than a diameter of the container 94 in a clamping portion in the rest state. Preferably, the clamping portion of the container is a portion of the container disposed below the opening of the container. In particular, the clamping portion may be a neck portion of a bottle neck of the container. In particular, the distance between the clamping members 138', 138" in the horizontal direction 142 may be equal to or smaller than the smallest diameter of the containers 94.

To insert a container 94 into one of the receptacles 134, the container 94 is moved in the transfer direction 140 from the first module into the receptacle until it is arranged in the receptacle 134, in particular until the container 94 is arranged between the clamping elements 138', 138". Once the container 94 has been inserted into the receptacle 134, the container is clamped perpendicular to the transfer direction 140 by means of the retaining device 136. During insertion, the container 94 is inserted between the clamping elements 138', 138". In the process, the clamping elements 138', 138" are pressed apart. In other words, the clamping elements 138', 138" are thereby spaced further apart from one another in the clamping direction, so that a pretensioning force is built up to clamp the container. The biasing force thereby pulls the clamping elements 138', 138" together, clamping the container 94. To remove the container 94 from the receptacle 134, the container 94 is moved further out of the receptacle 134 in the transfer direction 140 towards the second module until the container is positioned outside the receptacle 134.

Further, each retaining device 136 is configured to retain different containers 94 having different geometries in the respective receptacle 134. As previously described, the clamping elements 138', 138" are arranged so close to each other that when the container 94 is inserted into the receptacle 134, the container pushes the clamping elements 138', 138" apart. Depending on the container diameter, the clamping elements 138', 138" are pressed apart correspondingly far. In this way, it is achieved that different containers 94 with different geometries, in particular with different diameters, can be held in the receptacle 134 by means of the retaining device 136.

The transfer station 130 may further be closable to isolate the modules from each other. For this purpose, the transfer station 130 can, for example, have a cover device by means of which at least one side of the opening 132 can be completely covered.

Figure 11:
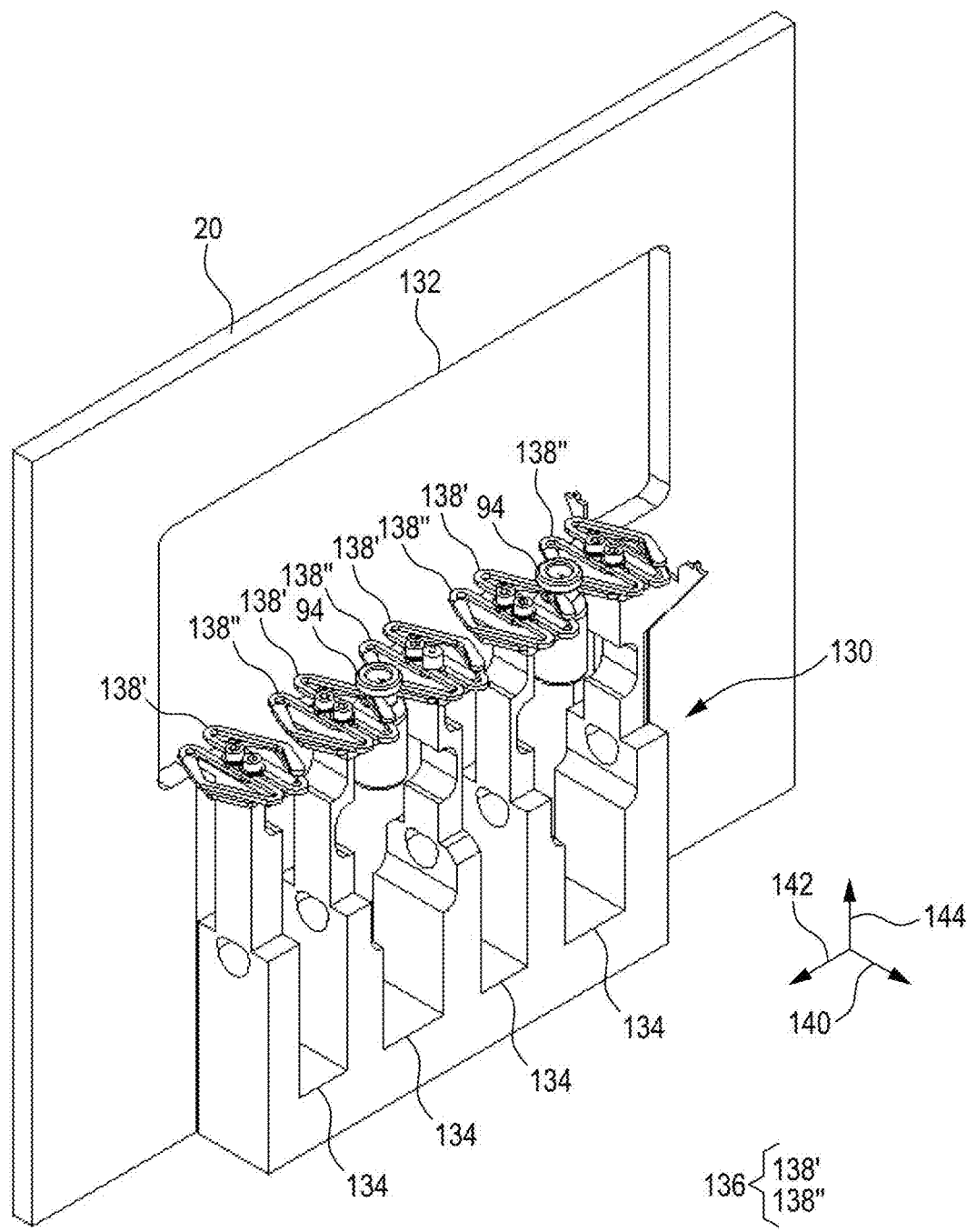
FIG. 11 is an isometric view of an embodiment of a transfer station for transferring containers.
Figure 12A:
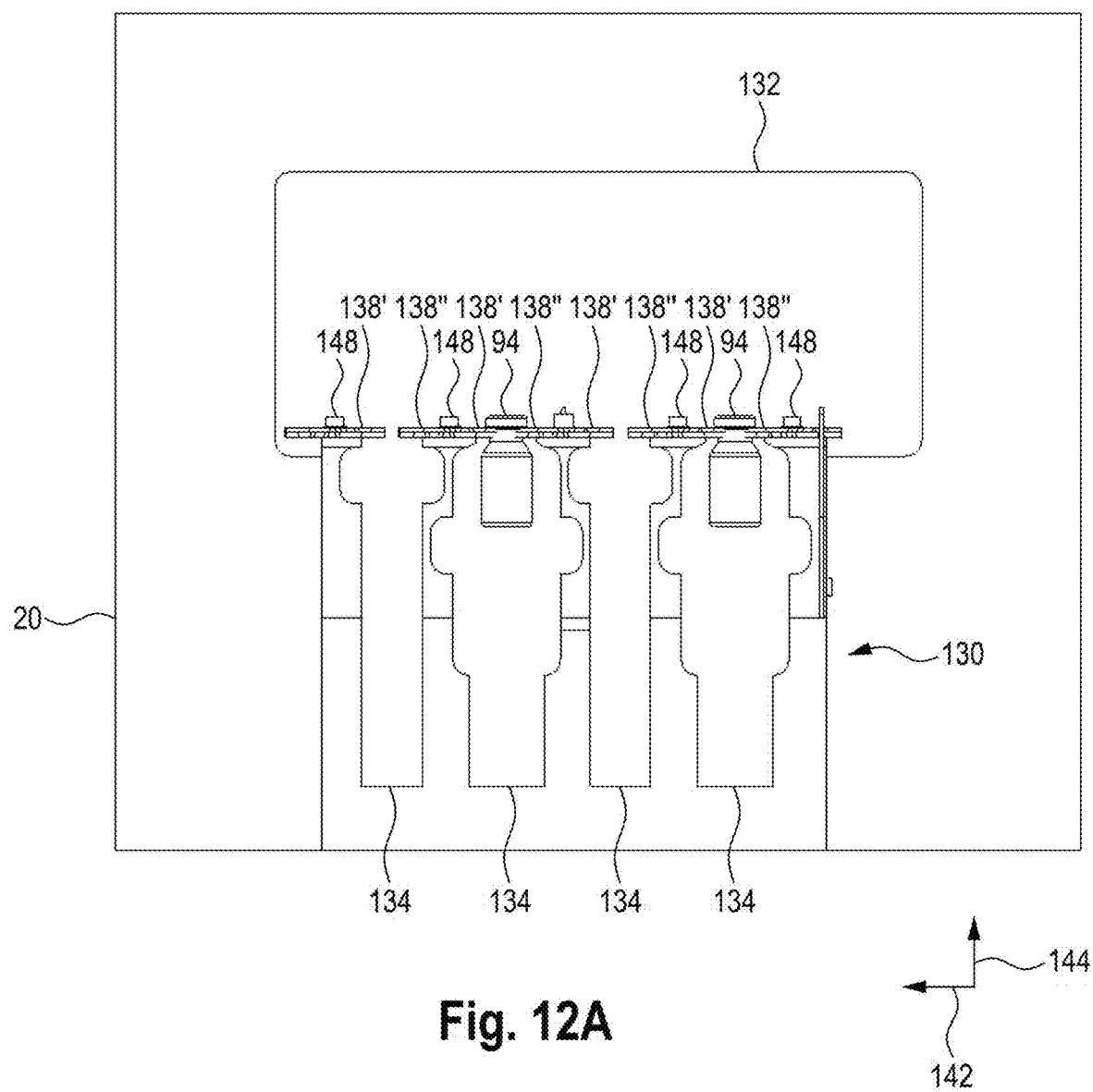
FIG. 12A is a frontal view of the transfer station of FIG. 11.
Figure 12B:
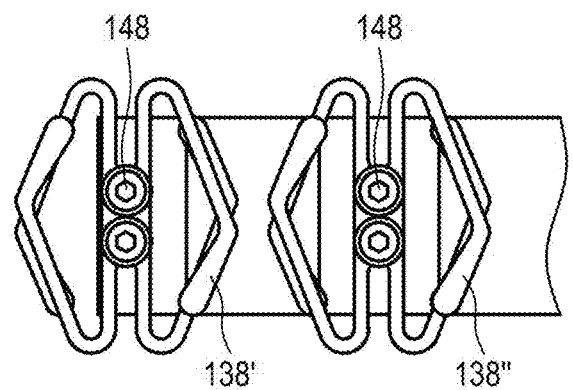
FIG. 12B is an enlarged partial view of the clamping elements in plan view.

In FIGS. 11 and 12A, two containers 94 are disposed in two of the four receptacles 134. The containers 94 are in the form of bottles.

Figure 13:
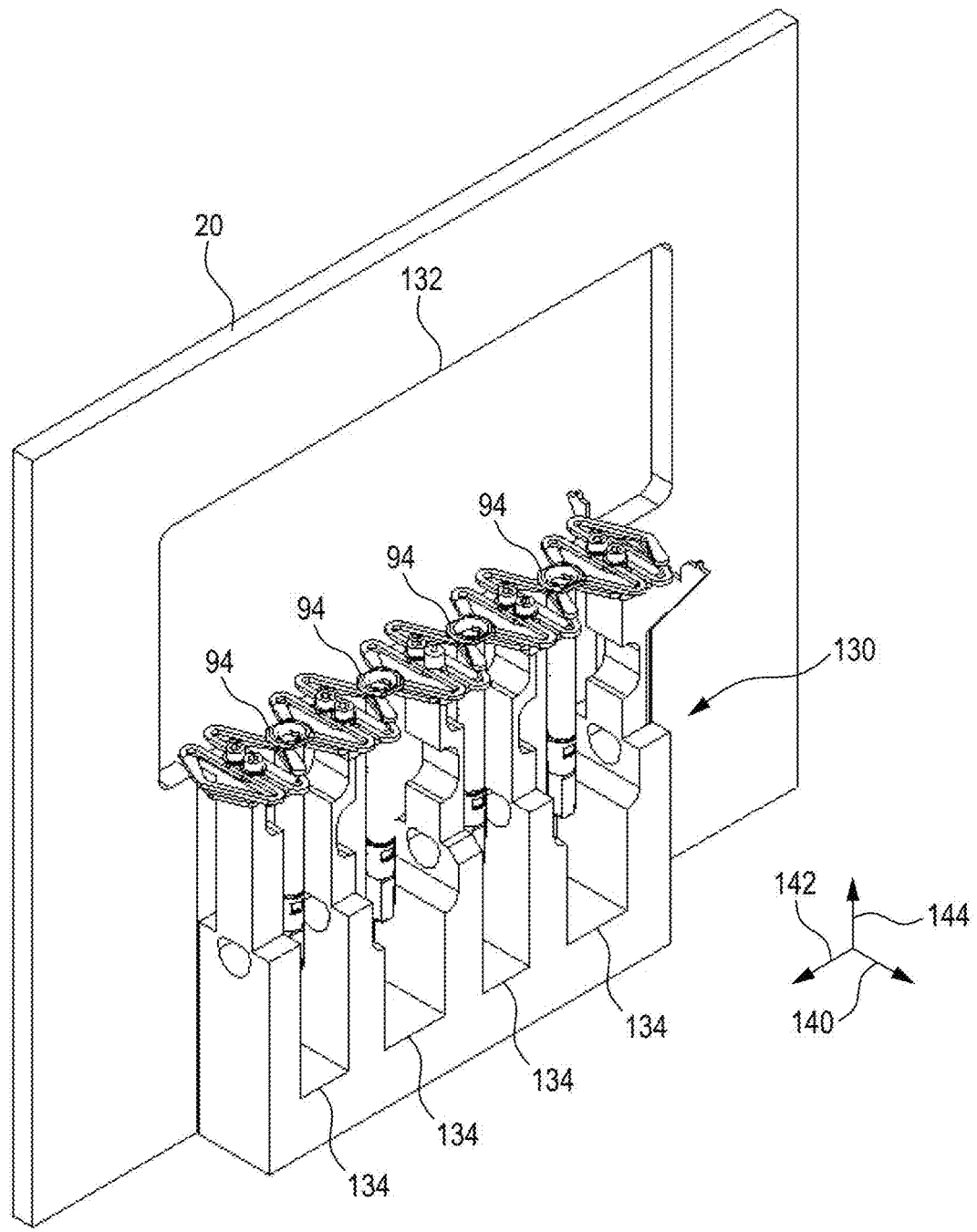
FIG. 13 is an isometric view of the transfer station of FIG. 11 with syringes arranged therein.
Figure 14:
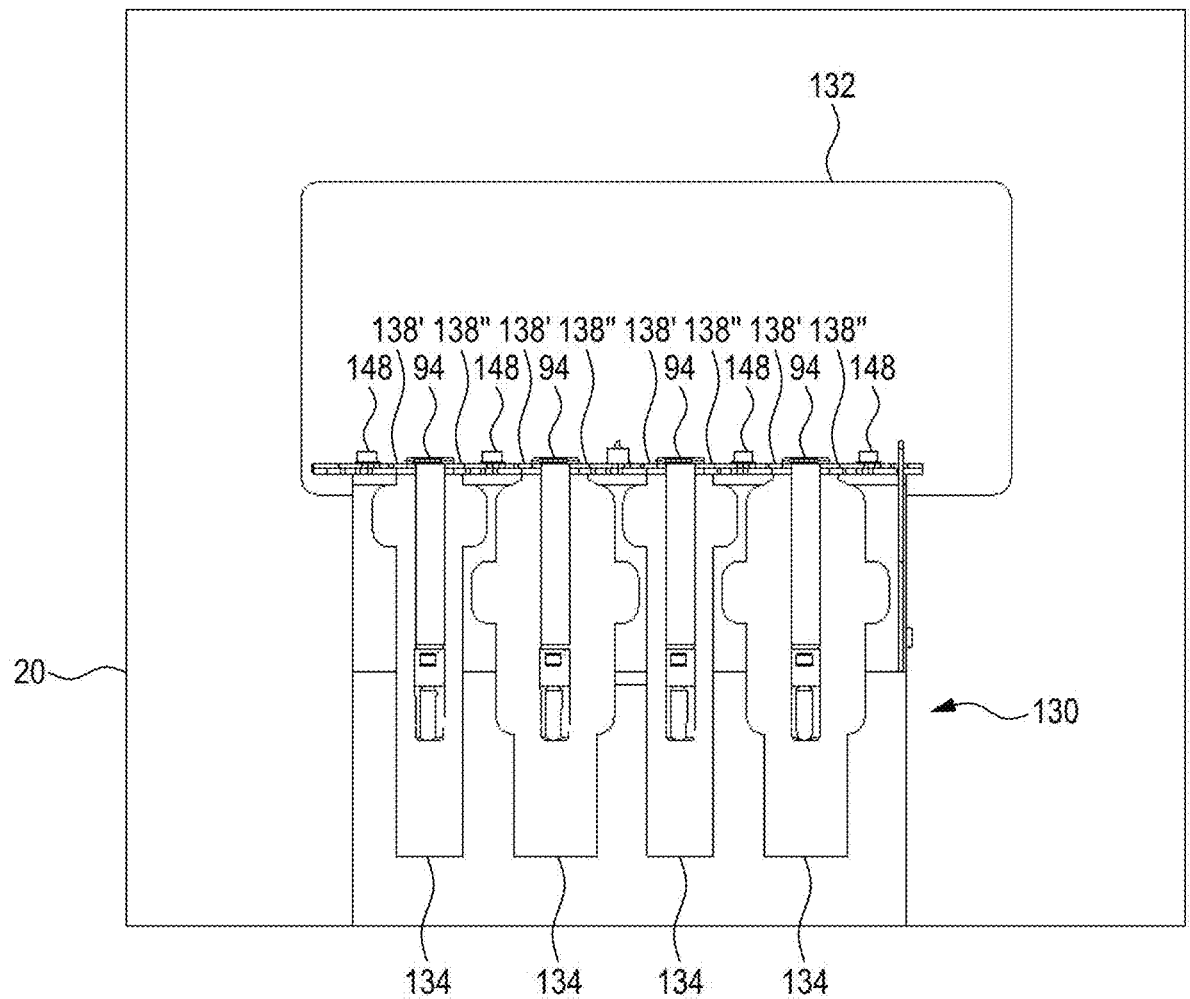
FIG. 14 is a frontal view of the transfer station from FIG. 13.

In FIGS. 13 and 14, four containers are arranged in the four receptacles 134. In other words, one container 94 is arranged in each receptacle 134. The containers 94 are in the form of syringes.

Figure 15:
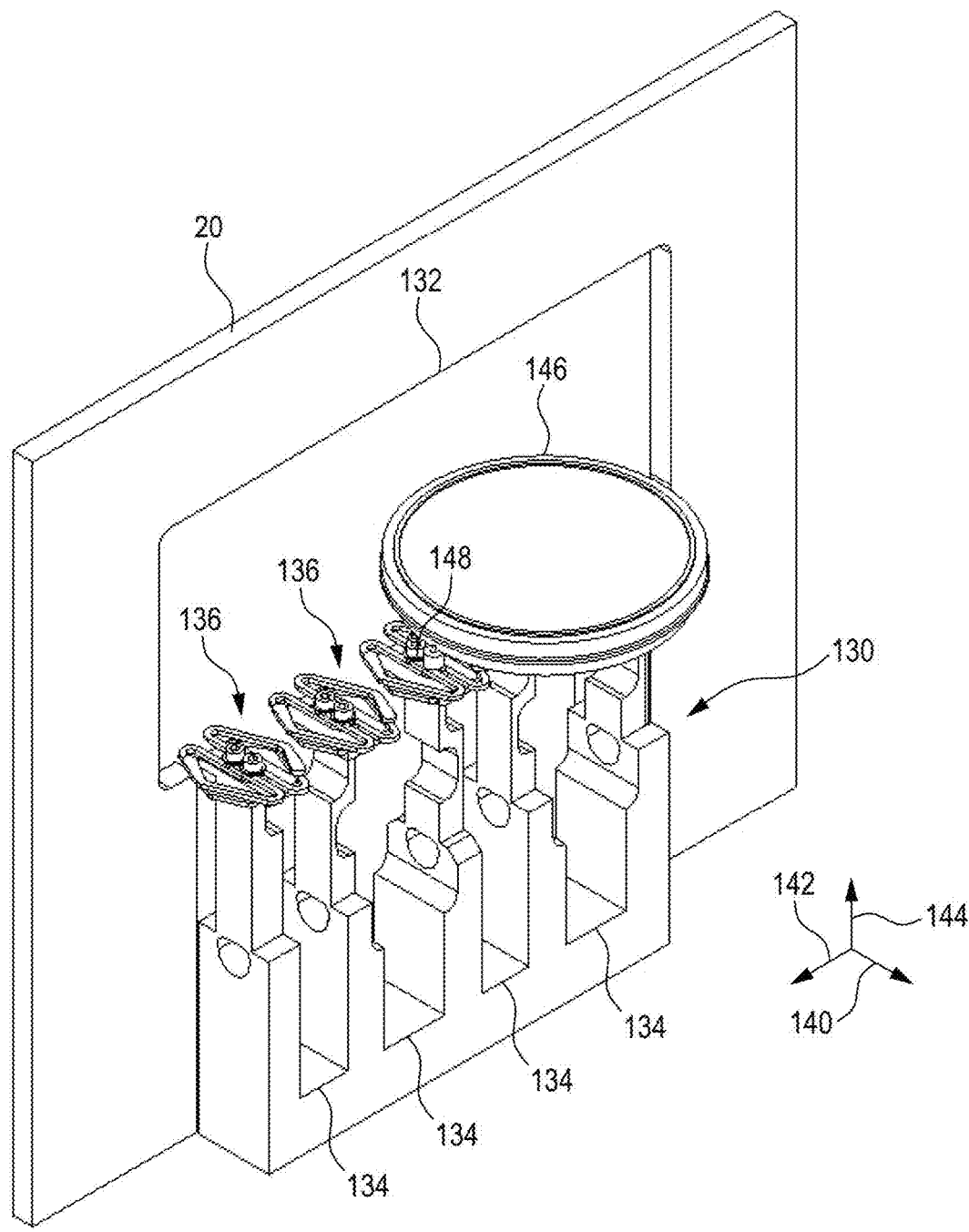
FIG. 15 is an isometric view of the transfer station of FIG. 11 with Petri dish arranged therein.

FIG. 15 shows that a Petri dish 146 can also be transferred by means of the transfer station 130. The Petri dish 146 can be placed on the transfer station 130 in the opening 132 for this purpose. The Petri dish 146 can thereby rest on the clamping elements of the 138', 138" of the retaining device 136. Alternatively, the transfer station 130 may include support elements 148 onto which the Petri dish 146 may be placed. The support elements 148 are disposed between the receptacles 134. The support elements 148 extend higher in the vertical direction 144 than the receptacles 134 and the retaining devices 136. The support elements 148 may be formed as nubs.

Figure 16:
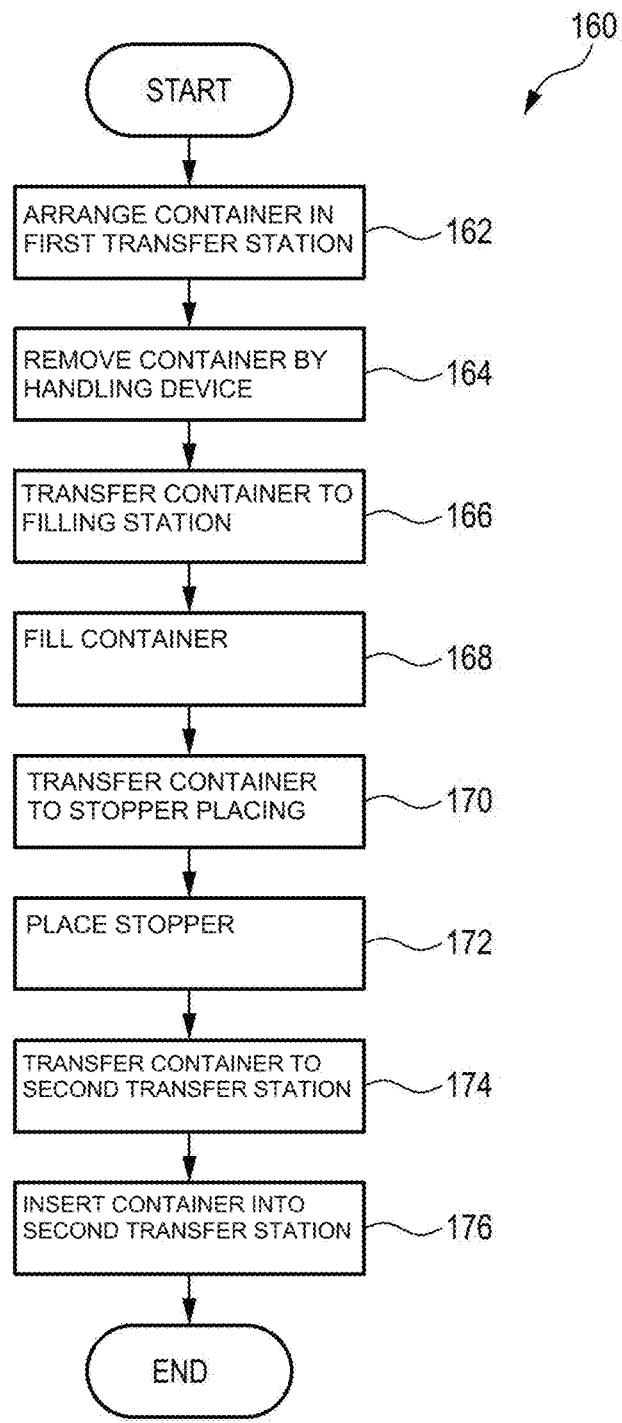
FIG. 16 is a schematic representation of a first embodiment of a method for filling a container.

FIG. 16 shows a first embodiment of a method 160 for filling a container 94 with a liquid in a filling module 14. The method 160 may be carried out using the isolator system 10 of any of FIGS. 1 to 3. In particular, the control device 68 of the isolator system 10 may be configured to control the isolator system 10 according to the process steps of the method 160.

In a first step 162 of the method 160, the container 94 to be filled is arranged in the first transfer station 22 for transferring the container 94 into the filling module 14.

In a further step 164 of the method 160, the container is removed from a receptacle of the first transfer station 22 by means of a handling device of the plurality of handling devices 42, 44 of the filling module 14, wherein the first transfer station 22 comprises at least one receptacle for the container 94. In particular, the container 94 is removed from the receptacle of the transfer station 22 by means of the first handling device 42.

In a further step 166 of the method 160, the container 94 is transferred from the first transfer station 22 to the filling station 38 of the filling module 14 by means of one or more handling devices of the plurality of handling devices 42, 44 of the filling module 14. In particular, the container 94 is transferred from the transfer station 22 to the filling station 38 by means of the first handling device 42.

In a further step 168 of the process 160, the container 94 is filled with the fluid in the filling station 38.

In a further step 170 of the method 160, the container 94 is transferred from the filling station 38 to the stopper placing station 40 by means of one or more handling devices of the plurality of handling devices 42, 44 of the filling module 14. In particular, the container 94 is transferred from the transfer station 22 to the filling station 38 by means of the first and/or the second handling device 42, 44.

In particular, in the step 170, the first handling device 42 can transfer the container 94 from the filling station 38 to the intermediate station 46 and the second handling device 44 can transfer the container 94 from the intermediate station 46 to the stopper placing station 40.

In another step 172 of the process 160, a stopper is placed on the container 94.

In a further step 174 of the method 160, the container 94 is transferred from the stopper placing station 40 to the second transfer station 24 by means of one or more handling devices of the plurality of handling devices 42, 44 of the filling module 14. In particular, the container 94 is transferred from the stopper placing station 40 to the second transfer station 24 by means of the second handling device 44.

In a further step 176 of the method 160, the container 94 is inserted or introduced into a receptacle of the second transfer station 24 by means of one or more handling devices of the plurality of handling devices 42, 44 of the filling module 14, the second transfer station 24 having at least one receptacle for the container 94. In particular, the container 94 is inserted into the receptacle of the transfer station 24 by means of the second handling device 44.

Figure 17:
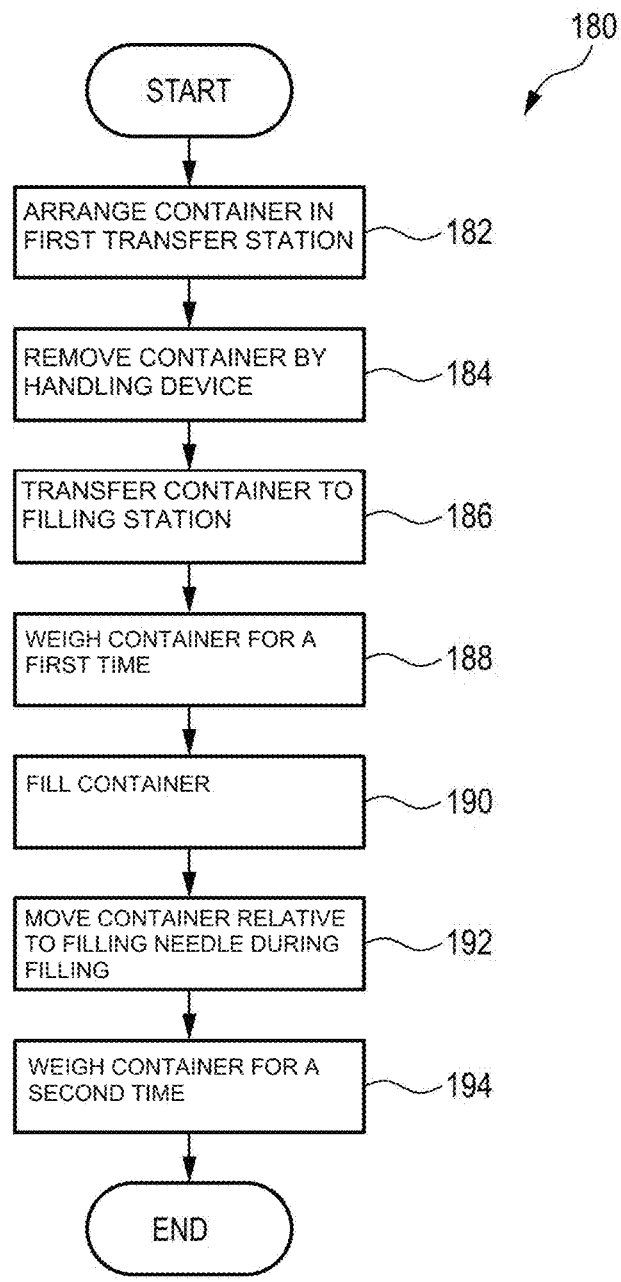
FIG. 17 is a schematic representation of a second embodiment of a method for filling a container.

FIG. 17 shows a second embodiment of a method 180 for filling a container 94 with a liquid in a filling module 14. The method 180 may be carried out by means of the isolator system 10 of any of FIGS. 1 to 3. In particular, the control device 68 of the isolator system 10 may be configured to control the isolator system 10 according to the process steps of the method 180.

Steps 182, 184, and 186 of method 180 correspond to steps 162, 164, and 166 of method 160.

In another step 188 of the method 180, the container 94 is weighed by the weighing device 110 prior to filling.

In a further step 190 of the process 180, the container 94 is filled with the liquid in the filling station 38, in particular by means of a filling needle 106 of the filling station 38.

In another step 192 of the method 180, the container 94 is moved relative to the filling needle 106 by the first handling device 42 while the container 94 is being filled.

In a further step 194 of the method 180, the container 94 is weighed after filling by means of the weighing device 110.

The container 94 may be placed on the weighing device for weighing by the first handling device 42 prior to filling and/or after filling.

Figure 18:
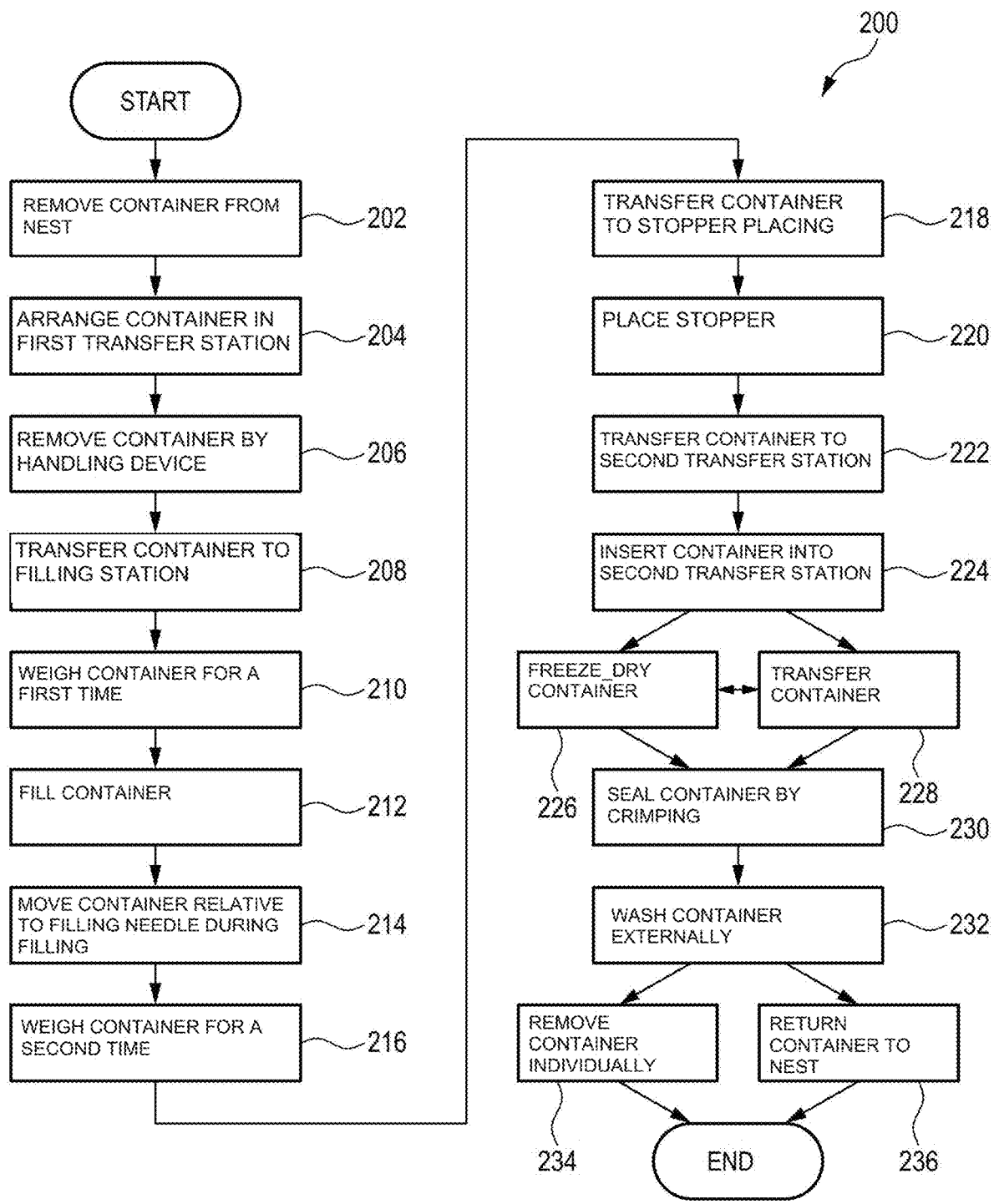
FIG. 18 is a schematic representation of a third embodiment of a method for filling a container.

FIG. 18 shows a third embodiment of a method 200 for filling a container 94 with a liquid in a filling module 14. The method 200 may be carried out by means of the isolator system 10 of any of FIGS. 1 to 3. In particular, the control device 68 of the isolator system 10 may be configured to control the isolator system 10 according to the process steps of the method 200.

In a first step 202 of the method 200, the container 94 to be filled is removed from a nest 92 by means of a removal module 12.

Steps 204 through 216 correspond to steps 182 through 194 of method 180.

Steps 218 to 224 correspond to steps 170 to 176 of method 160.

In another optional step 226 of the process 200, the filled container 94 is freeze dried using a freeze-drying module 70.

In another optional step 228 of the method 200, the filled container 94 is transferred between the filling module 14, the freeze-drying module 70, and the crimping module 16 by a transferring module 80.

In a further step 230 of the process 200, the filled container 94 is sealed by means of a crimping module 16.

In a further step 232 of the process 200, the sealed container 94 is washed externally.

In another optional step 234 of the process 200, the container 94 is individually removed after the external washing by means of a transport device.

Alternatively, in another optional step 236 of the process 200, the container 94 is returned to the nest from which it was removed after the external wash 94. To do this, the container 94 is transferred back through the individual modules to the removal module 12, where it is then reinserted into the nest.

Each module can be coupled to the decontamination device 66. The module can then be decontaminated by means of the decontamination device 66. Coupling can take place via the ventilation device 65.

Further, each transfer station 130 of the module may be sealed, particularly during decontamination, to isolate the module from adjacent modules.

Figure 19:
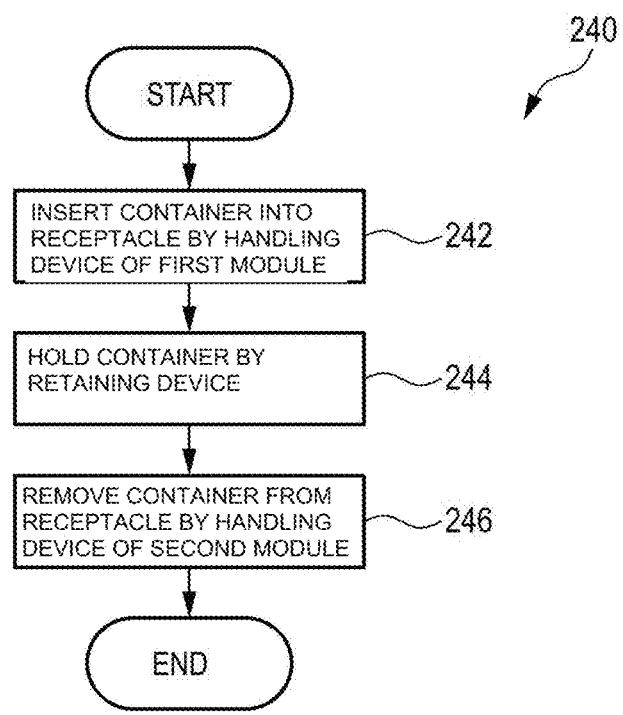
FIG. 19 is a schematic representation of a first embodiment of a method for transferring a container.

FIG. 19 illustrates one embodiment of a method 240 for transferring a container 94 from a first module to a second module using a transfer station 130. The transfer station 130 may be configured to correspond to the transfer station 130 of FIGS. 11 to 15. The two modules may be two adjacent modules of the isolator system 10 of any of FIGS. 1 to 3. In particular, the control device 68 of the isolator system 10 may be configured to control the isolator system 10 according to the process steps of the method 240.

In a first step 242 of the method 240, the container 94 is inserted into the receptacle 134 by a handling device of the first module in the transfer direction 140.

In another step 244 of the method 240, the container is held in the receptacle 134 by the retaining device 136.

In another step 246 of the method 240, the container 94 is removed from the receptacle 134 by a handling device of the second module in the transfer direction 140.

The optional step 228 can be performed as an intermediate step between steps 224 (transfer from the filling module), 226 (freeze-drying), and 230 (capping). In particular, by means of the transferring module 80, the container 94 can be transferred from the filling module 14 directly to the crimping module 16 without freeze-drying the container. Alternatively, by means of the transferring module 80, the container 94 can be transferred from the filling module 14 to the freeze-drying module 70 for freeze-drying the container. After freeze-drying, the transferring module 80 may be used to transfer the container 94 from the freeze-drying module 70 to the crimping module 16.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An isolator system for filling a container with a liquid, the isolator system comprising:
    a filling module having a filling station for filling the container with the liquid, a stopper placing station for placing a stopper on the filled container, and a plurality of handling devices for handling the container within the filling module;
    a transferring module for transferring the container between the filling module, a crimping module, and a freeze-drying module;
    a first transfer station for transferring the container to be filled into the filling module;
    a second transfer station for transferring the filled container from the filling module;
    a fourth transfer station, between the transferring module and the crimping module, for transferring the container between the transferring module and the crimping module;
    a fifth transfer station, between the transferring module and the freeze-drying module, for transferring the container between the transferring module and the freeze-drying module; and
    a control device,
    wherein the control device is configured to control:
        one or more of the plurality of handling devices to transfer, as a first transferring, the container to be filled from the first transfer station to the filling station;
        the filling station to fill the container with the liquid;
        one or more of the plurality of handling devices to transfer, as a second transferring, the container from the filling station to a stopper placing station;
        the stopper placing station to place a stopper on the filled container; and one or more of the plurality of handling devices to transfer, as a third transferring, the container from the stopper placing station to the second transfer station.

2. The isolator system according to claim 1, wherein the plurality of handling devices comprises a first handling device and a second handling device.

3. The isolator system according to claim 2, wherein the control device is configured to control: a first handling device to carry out the first transferring the first handling device and/or a second handling device to carry out the second transferring, and the second handling device to carry out the third transferring.

4. The isolator system according to claim 3, wherein the filling module comprises an intermediate station between the filling station and the stopper placing station, wherein the control device is configured to control: the first handling device to transfer the container from the filling station to the intermediate station during the first transferring, and the second handling device to transfer the container from the intermediate station to the stopper placing station during the second transferring.

5. The isolator system according to claim 1, wherein the isolator system further comprises a removal module for removing the container to be filled from a nest.

6. The isolator system according to claim 5, wherein the removal module is located upstream of the filling module.

7. The isolator system according to claim 5, wherein the first transfer station is arranged between the removal module and the filling module.

8. The isolator system according to claim 1, wherein the isolator system further comprises the crimping module for closing the filled container.

9. The isolator system according to claim 8, wherein the crimping module is arranged downstream of the filling module, wherein the filling module is arranged between the removal module and the crimping module.

10. The isolator system according to claim 1, wherein the isolator system further comprises the freeze-drying module for freeze-drying the filled containers.

11. The isolator system according to claim 10, wherein the freeze-drying module is disposed downstream of the filling module, wherein the freeze-drying module is disposed between the filling module and the crimping module.

12. The isolator system according to claim 1, wherein the transferring module is disposed between the filling module, the crimping module, and the freeze-drying module.

13. The isolator system according to claim 1, wherein the second transfer station is located between the filling module and the transferring module.

14. The isolator system according to claim 1, wherein the isolator system further comprises an external washing module for washing the exterior of the container.

15. The isolator system according to claim 14, wherein the external washing module is located downstream of the crimping module.

16. The isolator system according to claim 14, wherein the isolator system further comprises a sixth transfer station between the crimping module and the external washing module for transferring the container between the crimping module and the external washing module.

17. The isolator system according to claim 1, wherein a partition wall is arranged between successive modules of the isolator system.

18. The isolator system according to claim 17, wherein in each partition is arranged the respective transfer station for transferring the container between the corresponding modules.

19. The isolator system according to claim 17, wherein each module of the isolator system comprises at least two handling devices for handling the container in the corresponding module.

20. The isolator system according to claim 1, wherein the isolator system further comprises a decontamination device for decontaminating at least one module of the isolator system, wherein at least one module selected from a list comprising the filling module, a removal module, the crimping module, the freeze-drying module, the transferring module, and an external washing module is couplable to the decontamination device to decontaminate the at least one module.

21. The isolator system according to claim 1, wherein each transfer station is closable to isolate the respective adjacent modules from each other.

22. Isolator system according to claim 1, wherein each transfer station comprises at least one receptacle for receiving the container.

23. The isolator system according to claim 1, wherein each handling device of the plurality of handling devices of the filling module is designed such that it can handle at least two containers simultaneously, wherein the first and the second transfer stations are designed such that at least two containers can be transferred simultaneously.

24. The isolator system according to claim 1, wherein each module is configured such that two containers can be handled simultaneously.

25. The isolator system according to claim 1, wherein the filling station comprises a filling needle for dispensing the liquid and filling the container, wherein the filling needle is designed to be inserted into the container through an opening of the container for filling.

26. The isolator system according to claim 25, wherein the control device is configured to control:
a first handling device to move the container relative to the filling needle while the container is being filled.

27. The isolator system according to claim 26, wherein at the beginning of the filling, a tip of the filling needle is located at the bottom of the container, and when the container is moved the tip of the filling needle is displaced from the bottom toward the opening of the container.

28. The isolator system according to claim 1, wherein the filling station comprises a weighing device for weighing the container.

29. The isolator system according to claim 28, wherein the control device is configured to control a first handling device such that the first handling device places the container on the weighing device for weighing prior to filling and/or after filling.

30. The isolator system according to claim 28, wherein the weighing device is arranged below the filling needle.

31. An isolator system for filling a container with a liquid, the isolator system comprising:
a filling module having a filling station for filling the container with the liquid, a stopper placing station for placing a stopper on the filled container, and a plurality of handling devices for handling the container within the filling module;
a first transfer station for transferring the container to be filled into the filling module;
a second transfer station for transferring the filled container from the filling module; and a control device,
wherein the control device is configured to control:
- one or more of the plurality of handling devices to transfer, as a first transferring, the container to be filled from the first transfer station to the filling station;
- the filling station to fill the container with the liquid;
- one or more of the plurality of handling devices to transfer, as a second transferring, the container from the filling station to a stopper placing station;
- the stopper placing station to place a stopper on the filled container; and
- one or more of the plurality of handling devices to transfer, as a third transferring, the container from the stopper placing station to the second transfer station, and wherein the isolator system is configured such that the container is transferred back to a removal module after filling and stopper placing in the filling module or after capping in a crimping module or after external washing in an external washing module through the individual modules, and wherein the removal module is configured to place the container back into a nest from which it was removed.

32. The isolator system according to claim 31, wherein the control device is configured to control: a first handling device to carry out the first transferring, the first handling device and/or a second handling device to carry out the second transferring, and the second handling device to carry out the third transferring.

33. The isolator system according to claim 32, wherein the filling module comprises an intermediate station between the filling station and the stopper placing station, wherein the control device is configured to control: the first handling device to transfer the container from the filling station to the intermediate station during the first transferring, and the second handling device to transfer the container from the intermediate station to the stopper placing station during the second transferring.

34. The isolator system according to claim 31, wherein the removal module is located upstream of the filling module.

35. The isolator system according to claim 31, wherein the crimping module is arranged downstream of the filling module, wherein the filling module is arranged between the removal module and the crimping module.

36. The isolator system according to claim 31, wherein the isolator system further comprises a freeze-drying module for freeze-drying the filled containers.

37. The isolator system according to claim 36, wherein the freeze-drying module is disposed downstream of the filling module, wherein the freeze-drying module is disposed between the filling module and the crimping module.

38. The isolator system according to claim 36, wherein the isolator system further comprises a transferring module that is disposed between the filling module, the crimping module, and the freeze-drying module.

39. The isolator system according to claim 31, wherein the external washing module is located downstream of the crimping module.

40. The isolator system according to claim 31, wherein the isolator system further comprises a sixth transfer station between the crimping module and the external washing module for transferring the container between the crimping module and the external washing module.

41. The isolator system according to claim 31, wherein a partition wall is arranged between successive modules of the isolator system, and in each partition wall is arranged the respective transfer station for transferring the container between the corresponding modules.

42. The isolator system according to claim 31, wherein the isolator system further comprises a decontamination device for decontaminating at least one module of the isolator system, wherein at least one module selected from a list comprising the filling module, the removal module, the crimping module, a freeze-drying module, a transferring module, and the external washing module is couplable to the decontamination device to decontaminate the at least one module.

43. The isolator system according to claim 31, wherein each transfer station is closable to isolate the respective adjacent modules from each other.

44. The isolator system according to claim 31, wherein each transfer station comprises at least one receptacle for receiving the container.

45. The isolator system according to claim 31, wherein each handling device of the plurality of handling devices of the filling module is designed such that it can handle at least two containers simultaneously, the first and the second transfer stations are designed such that at least two containers can be transferred simultaneously, and each module is configured such that two containers can be handled simultaneously.

46. The isolator system according to claim 31, wherein the filling station comprises a filling needle for dispensing the liquid and filling the container, wherein the filling needle is designed to be inserted into the container through an opening of the container for filling.

47. The isolator system according to claim 46, wherein the control device is configured to control:
- a first handling device to move the container relative to the filling needle while the container is being filled.

48. The isolator system according to claim 31, wherein the filling station comprises a weighing device for weighing the container.

49. The isolator system according to claim 48, wherein the weighing device is arranged below a filling needle.

50. An isolator system for filling a container with a liquid, the isolator system comprising:
- a filling module having a filling station for filling the container with the liquid, a stopper placing station for placing a stopper on the filled container, and a plurality of handling devices for handling the container within the filling module;
- a first transfer station for transferring the container to be filled into the filling module;
- a second transfer station for transferring the filled container from the filling module; and
- a control device,
wherein the control device is configured to control;
- one or more of the plurality of handling devices to transfer, as a first transferring, the container to be filled from the first transfer station to the filling station;
- the filling station to fill the container with the liquid;
- one or more of the plurality of handling devices to transfer, as a second transferring, the container from the filling station to a stopper placing station:
- the stopper placing station to place a stopper on the filled container; and
- one or more of the plurality of handling devices to transfer, as a third transferring, the container from the stopper placing station to the second transfer station, wherein each transfer station comprises at least one receptacle for receiving the container, and wherein the receptacle is open in a transfer direction between the adjacent modules toward the adjacent modules so that the container is insertable in the transfer direction into the receptacle by a handling device and removable in the transfer direction from the receptacle by a handling device.

51. The isolator system according to claim 50, wherein the control device is configured to control: a first handling device to carry out the first transferring, the first handling device and/or a second handling device to carry out the second transferring, and the second handling device to carry out the third transferring.

52. The isolator system according to claim 51, wherein the filling module comprises an intermediate station between the filling station and the stopper placing station, wherein the control device is configured to control: the first handling device to transfer the container from the filling station to the intermediate station during the first transferring, and the second handling device to transfer the container from the intermediate station to the stopper placing station during the second transferring.

53. The isolator system according to claim 50, wherein a removal module is located upstream of the filling module.

54. The isolator system according to claim 53, wherein a crimping module is arranged downstream of the filling module, wherein the filling module is arranged between the removal module and the crimping module.

55. The isolator system according to claim 50, wherein the isolator system further comprises a freeze-drying module for freeze-drying the filled containers.

56. The isolator system according to claim 55, wherein the freeze-drying module is disposed downstream of the filling module, wherein the freeze-drying module is disposed between the filling module and a crimping module.

57. The isolator system according to claim 56, wherein the isolator system further comprises a transferring module that is disposed between the filling module, the crimping module, and the freeze-drying module.

58. The isolator system according to claim 50, wherein an external washing module is located downstream of a crimping module.

59. The isolator system according to claim 58, wherein the isolator system further comprises a sixth transfer station between the crimping module and the external washing module for transferring the container between the crimping module and the external washing module.

60. The isolator system according to claim 50, wherein a partition wall is arranged between successive modules of the isolator system, and in each partition wall is arranged the respective transfer station for transferring the container between the corresponding modules.

61. The isolator system according to claim 50, wherein the isolator system further comprises a decontamination device for decontaminating at least one module of the isolator system, wherein at least one module selected from a list comprising the filling module, a removal module, a crimping module, a freeze-drying module, a transferring module, and an external washing module is couplable to the decontamination device to decontaminate the at least one module.

62. The isolator system according to claim 50, wherein each transfer station is closable to isolate the respective adjacent modules from each other.

63. The isolator system according to claim 50, wherein each handling device of the plurality of handling devices of the filling module is designed such that it can handle at least two containers simultaneously, the first and the second transfer stations are designed such that at least two containers can be transferred simultaneously, and each module is configured such that two containers can be handled simultaneously.

64. The isolator system according to claim 50, wherein the filling station comprises a filling needle for dispensing the liquid and filling the container, wherein the filling needle is designed to be inserted into the container through an opening of the container for filling.

65. The isolator system according to claim 64, wherein the control device is configured to control:
a first handling device to move the container relative to the filling needle while the container is being filled.

66. The isolator system according to claim 50, wherein the filling station comprises a weighing device for weighing the container.

67. The isolator system according to claim 66, wherein the weighing device is arranged below a filling needle.

* * * * *